US006965451B1

(12) United States Patent
Ogg et al.

(10) Patent No.: US 6,965,451 B1
(45) Date of Patent: Nov. 15, 2005

(54) METHOD AND APPARATUS FOR PRINTING INDICIA, LOGOS AND GRAPHICS ONTO PRINT MEDIA

(75) Inventors: Craig Leonard Ogg, Long Beach, CA (US); Keith Bussell, Los Angeles, CA (US)

(73) Assignee: Stamps.com, Santa Monica, CA (US)

( * ) Notice: Subject to any disclaimer, the term of this patent is extended or adjusted under 35 U.S.C. 154(b) by 713 days.

(21) Appl. No.: 09/651,389

(22) Filed: Aug. 29, 2000

Related U.S. Application Data

(60) Provisional application No. 60/160,034, filed on Oct. 18, 1999, provisional application No. 60/151,487, filed on Aug. 30, 1999.

(51) Int. Cl.[7] .............................................. G06F 15/00
(52) U.S. Cl. ..................... 358/1.8; 358/1.12; 358/1.17; 358/1.5; 358/1.1; 347/2; 347/4
(58) Field of Search ............................. 358/1.18, 1.12, 358/1.17, 1.5, 1.1, 1.16; 347/2, 4

(56) References Cited

U.S. PATENT DOCUMENTS

| | | | |
|---|---|---|---|
| 4,661,001 A | 4/1987 | Takai et al. | 400/103 |
| 4,831,555 A | 5/1989 | Sansone et al. | |
| 4,862,386 A | 8/1989 | Axelrod et al. | 364/518 |
| 4,900,903 A | 2/1990 | Wright et al. | |
| 4,900,904 A | 2/1990 | Wright et al. | |
| 4,908,770 A | 3/1990 | Breault et al. | |
| 5,048,085 A | 9/1991 | Abraham et al. | |
| 5,111,030 A | 5/1992 | Brasington et al. | |
| 5,454,038 A | 9/1995 | Cordery et al. | |
| 5,524,995 A | 6/1996 | Brookner et al. | |
| 5,819,240 A | 10/1998 | Kara | |
| 5,822,739 A | 10/1998 | Kara | |
| 5,825,893 A | 10/1998 | Kara | |
| 5,825,996 A * | 10/1998 | Davis et al. | 358/1.18 |
| 6,010,156 A | 1/2000 | Block | 281/2 |
| 6,461,063 B1 * | 10/2002 | Miller et al. | 400/76 |

FOREIGN PATENT DOCUMENTS

| | | |
|---|---|---|
| EP | 360225 A2 | 9/1989 |
| EP | 926630 A2 | 10/1998 |
| EP | 923024 A2 | 12/1998 |

OTHER PUBLICATIONS

How the Envelope Feed Option Icon, which is found at http://support.microsoft.com/support/kb/articles/Q100/0/85.asp, Aug. 28, 2000, 4 pp.

Custom Paper Size Changes to C5 Envelope with HP II or 4, which is found at http://support.microsoft.com/support/kb/articles/Q120/6/76.asp, Aug. 28, 2000, 2 pp.

(Continued)

*Primary Examiner*—Twyler Lamb
(74) *Attorney, Agent, or Firm*—Christie, Parker & Hale, LLP

(57) ABSTRACT

The present invention is directed toward a method and system for printing information onto a print media. In one aspect the present invention may be utilized by an on-line postage system to query one or more databases, containing set up data on one or more printer drivers, to determine set up data for a user's printer. The present invention may then be used to perform a printer configuration test to determine the set up data for the user's printer if the set up data is not contained in the databases. The present invention then stores the results of the printer configuration test in one or more of the database for use by subsequent users.

22 Claims, 38 Drawing Sheets

OTHER PUBLICATIONS

Word for Windows 1.x: Printing Envelopes on the IBM 4019, which is found at http://support.microsoft.com/support/kb/articles/Q102/3/93.ASP, Aug. 28, 2000, 6 pp.
Changing Printing Functionality with Printer Heuristics, which is found at http://support.microsoft.com/support/kb/articles/Q79/9/30.ASP, Aug. 28, 2000, 3 pp.
Envelopes Print Blank Using Canon LBP-4 Printer, which is found at http://support.microsoft.com/support/kb/articles/Q110/8/68.ASP, Aug. 28, 2000, 1 page.
Custom Paper Sizes Print in Wrong Location, which is found at http://support.microsoft.com/support/kb/articles/Q115/2/53.ASP, Aug. 28, 2000, 2 pp.
WD2000: Page Borders May Be Displayed or Printed Incorrectly, which is found at http://support.microsoft.com/support/kb/articles/Q189/8/89.APS, Aug. 28, 2000, 3 pp.
WD2000: "Margins Set Outside Printable area of Page", which is found at http://support.microsoft.com/support/kb/articles/Q191/0/31.ASP, 1 page.
U.S. Appl. No. 09/651,390, filed Aug. 29, 2000, Virtualized Printing of Indicia, Logos and Graphics, 95 sheets.

* cited by examiner

Origin with no envelope image rotation (EIR)

Printer #5
Print QA envelope

Printer #6
Mail QA envelope

Finish #1
*Congrats*

METHOD AND APPARATUS FOR PRINTING INDICIA, LOGOS AND GRAPHICS ONTO PRINT MEDIA

CROSS-REFERENCE TO RELATED APPLICATION(S)

This application claims priority to U.S. Provisional Patent Application No. 60/160,034, filed Oct. 18, 1999 and U.S. Provisional Application No. 60/151,487, filed Aug. 30, 1999. This application contains subject matter that may be considered to be related to U.S. patent application Ser. No. 09/651,390, filed Aug. 29, 2000, titled VIRTUALIZED PRINTING OF INDICIA, LOGOS AND GRAPHICS. The contents of all of the preceding applications are hereby incorporated by reference.

FIELD OF THE INVENTION

The present invention relates generally to systems and methods for printing indicia, logos and graphics and more particularly to systems and methods for printing postal indica on envelopes.

BACKGROUND

Metered postage is a significant source of revenue for the United States Postal Service (USPS). Metered postage is generated by utilizing postage meters that print a special mark, also known as postal indicia, on mail pieces. Generally, printing postage or any value-bearing items (VBI) may be accomplished with mechanical meters or computer-based systems.

With respect to computer-based postage processing systems, the USPS under the information-based indicia program (IBIP) has published specifications for IBIP postage meters. The IBIP involves the development of new technology to produce new forms of postage. In so-called PC postage systems, a user can purchase postage credit, and print the postage in the form of PC postage onto a label or directly onto a mail piece. The PC postage includes a human readable portion, an indicia graphic and a two dimensional barcode portion. The human readable portion includes the postage value, mail class, the date, the meter number, the licensing post office that a user registered with, an optional logo and optionally also the destination zip code (required for business courtesy mail pieces.) The barcode portion is intended to help thwart fraud, and includes information about the mail piece including the destination ZIP code, the amount of postage applied, the date and time the postage was applied, the meter number and a digital signature so that the USPS can validate the authenticity of the postage.

The USPS mail automation process utilizes various scanning machines when sorting the mail. Therefore, postage indicia must be printed in a prescribed manner to permit the mail handling and optical reading equipment to properly interpret the PC postage and addressee information. Indeed, the USPS has established strict guidelines directed to the margins, label sizes, and placement of the postage indicia, as well as the size, placement, and other characteristics of the POSTNET (POStal Numeric Encoding Technique) bar codes, and any facing identification mark (FIM) on mail pieces. These guidelines are contained in the Domestic Mail Manual (DMM) and Title 39, Code of Federal Register (CFR), Part 111, and USPS Publication No. 25 "Designing Letter Mail".

To ensure that a mail piece can be properly scanned, the mail piece needs to be oriented in a pre-defined manner. Proper orientation of the mail piece is facilitated by means of a FIM barcode or a phosphorescent strip, one of which should be included on each piece of automated mail. However, a FIM in the form of a phosphorescent strip typically requires the use of a specialized envelope or label, since standard printers are unable to print a phosphorescent strip. Referring to FIG. 1, a FIM barcode 8 on the other hand, is simply a pattern of vertical bars printed in the upper right area of a mail piece. Advantageously, the FIM barcode may be printed using the ink from a standard ink jet or laser jet printer. Therefore, indicia-based postage can penetrate the mainstream mass-market more easily with a FIM barcode solution.

A FIM barcode is essentially a nine-bit code consisting of bars and spaces (no-bar place holders) in which the bars corresponding to a binary one and spaces correspond to a binary zero. The FIM barcode 8 allows scanning machines to determine the orientation of individual mail pieces and the corners of both sides of the mail piece. Once the scanner has determined where the FIM barcode is on the mail piece, the mail piece may be re-oriented so that the scanner can properly read the delivery information.

The aforementioned USPS guidelines require the FIM pattern to be printed in a FIM clear zone, in which no other printing appears. The FIM clear zone is defined as a rectangular zone extending downwardly 0.625" from the upper edge of the mail piece and between 3.0" and 1.75" from the right hand edge of the mail piece.

The guidelines further require the bars in the FIM barcode to be 0.625"±0.125" high and 0.03125"±0.008" wide. Referring to FIG. 2, the rightmost bar of the FIM barcode should be 2"±0.125" from the right edge of the mail piece. The top of the bars in the FIM barcode should be no lower than 0.125" from the top of the mail piece and the bottom of the FIM bars should touch the bottom edge of the FIM clear zone but must not be more than 0.125" above or below that edge.

Standard printers typically do not support print margins of 0.125" or less. If an envelope is fed to a printer long edge first, the distance from the FIM barcode to the edge is determined by the top margin of the print job created by the printer, which is typically well in excess of 0.125" on standard ink jet and laser jet printers. Similarly, if an envelope is fed to a printer short edge first, the distance from the FIM to the edge of the envelope is still determined by the top margin of the printer because the printer prints the envelope in landscape mode. Again, the top margin is typically greater than 0.125" on most printers Short edge feed is shown in the following diagram., the distance from the FIM barcode to the edge is determined by either the left or right side margin of the printer, which is also typically well in excess of 0.125" on most printers.

The inability of most printers to comply with the tolerances set forth for FIM barcode location in the USPS automation system may require printing indicia based postage onto labels and/or envelopes with the FIM barcode pre-printed onto them. Therefore, it would be advantageous to provide a method and system for printing text or graphics within tight edge constraints for use in postage systems that use a printer to print indicia-based postage.

SUMMARY OF THE INVENTION

In one aspect of the present invention, a method for printing information onto a print media includes translating a first component of the information as a function of printer margin size, determining a printable bounding area as a function of the first component, scaling a second component of the information as a function of the printable bounding area and printing the information.

In another aspect of the present invention, a method of printing information onto a print media includes querying one or more printer databases containing set up data on one or more printer drivers to determine set up data for a user's printer, performing a printer configuration test to determine set up data as a function of the query, storing results of the printer configuration test in the printer database and printing the information onto the print media in accordance with the set up data.

In a further aspect of the present invention, a system for printing information onto a print media includes means for querying one or more databases, containing set up data on one or more printer drivers, to determine set up data for a user's printer, means for performing a printer configuration test to determine the set up data as a function of said query, means for storing results of said printer configuration test in the printer database and means for printing said information onto said print media in accordance with said set up data.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

An exemplary embodiment of the present invention enables postage systems to print indicia-based postage within the constraints established by the USPS. An example of such a postage system is a software-based, on-line postage system described in U.S. patent application Ser. No. 09/163,993 filed on Sep. 29, 1998, by Mohan Ananda, entitled "On Line Postage System", the contents of which are hereby incorporated by reference as if set forth in full. The on-line postage system software comprises user code or client software that resides on a client system and controller code that resides on a server system. The on-line postage system allows a client to securely print a postal indicium at home, at the office, or any other desired place.

An exemplary online postage system may comprise a user system electronically connected to a server system, which in turn is connected to a USPS system. The server system is preferably capable of communicating with one or more client systems simultaneously. In operation, a licensed and registered client of the on-line postage system sends a request for authorization to print a desired amount of postage. A postal security device (PSD) server determines whether the client's account balance is sufficient to cover the requested amount of postage, and if so, communicates an authorization to the client system. The client system then sends image information for printing a postal indicium for the granted amount to a printer so that the postal indicium is printed on the print media, such as for example, an envelope, post card or label. The printed indicium appears as a two-dimensional bar code that includes a unique serial number, mail delivery point information, and the amount of postage. Once the postage information is printed on an individual piece of mail, it may be mailed and processed by the USPS.

Figure 1:
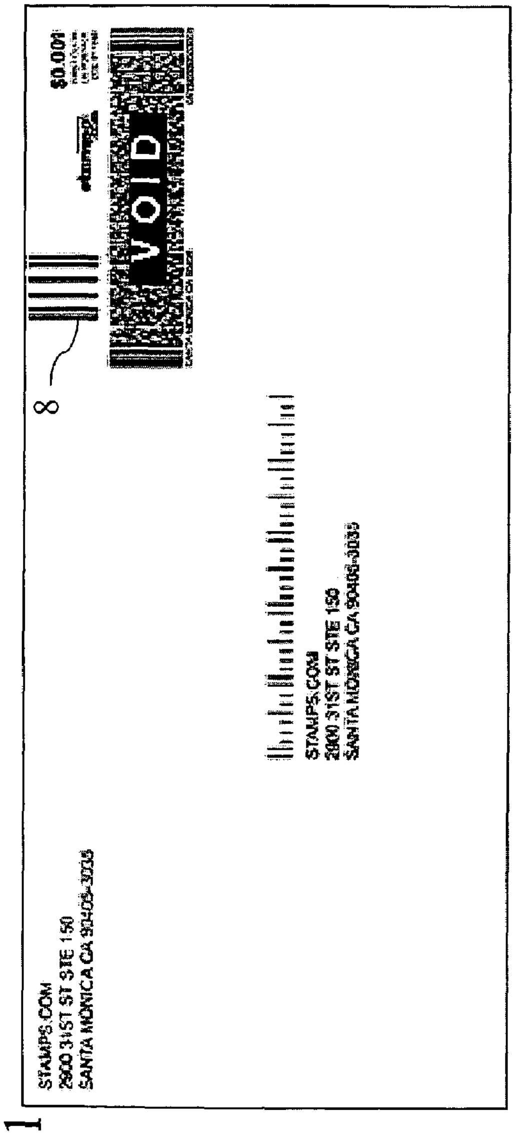
FIG. 1 is a plan view of an envelope with a barcode printed in accordance with USPS requirements in the upper right hand corner of the envelope.
Figure 2:
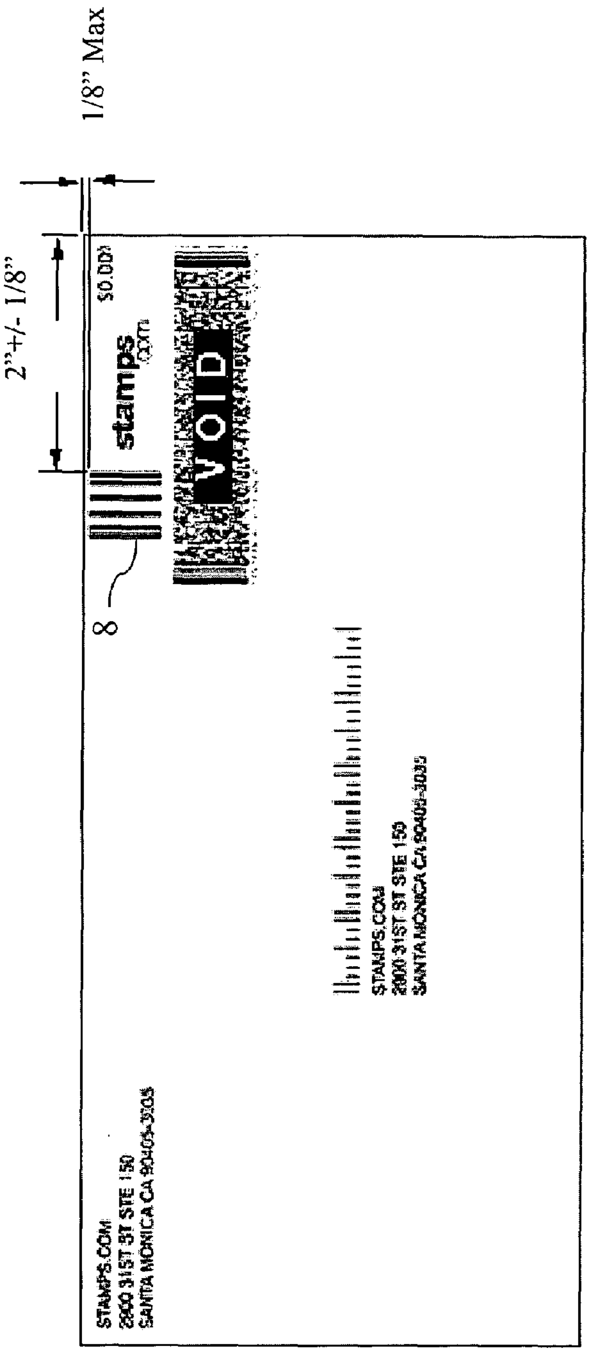
FIG. 2 is a plan view of an envelope demonstrating the USPS requirements for FIM barcode placement.
Figure 3A:
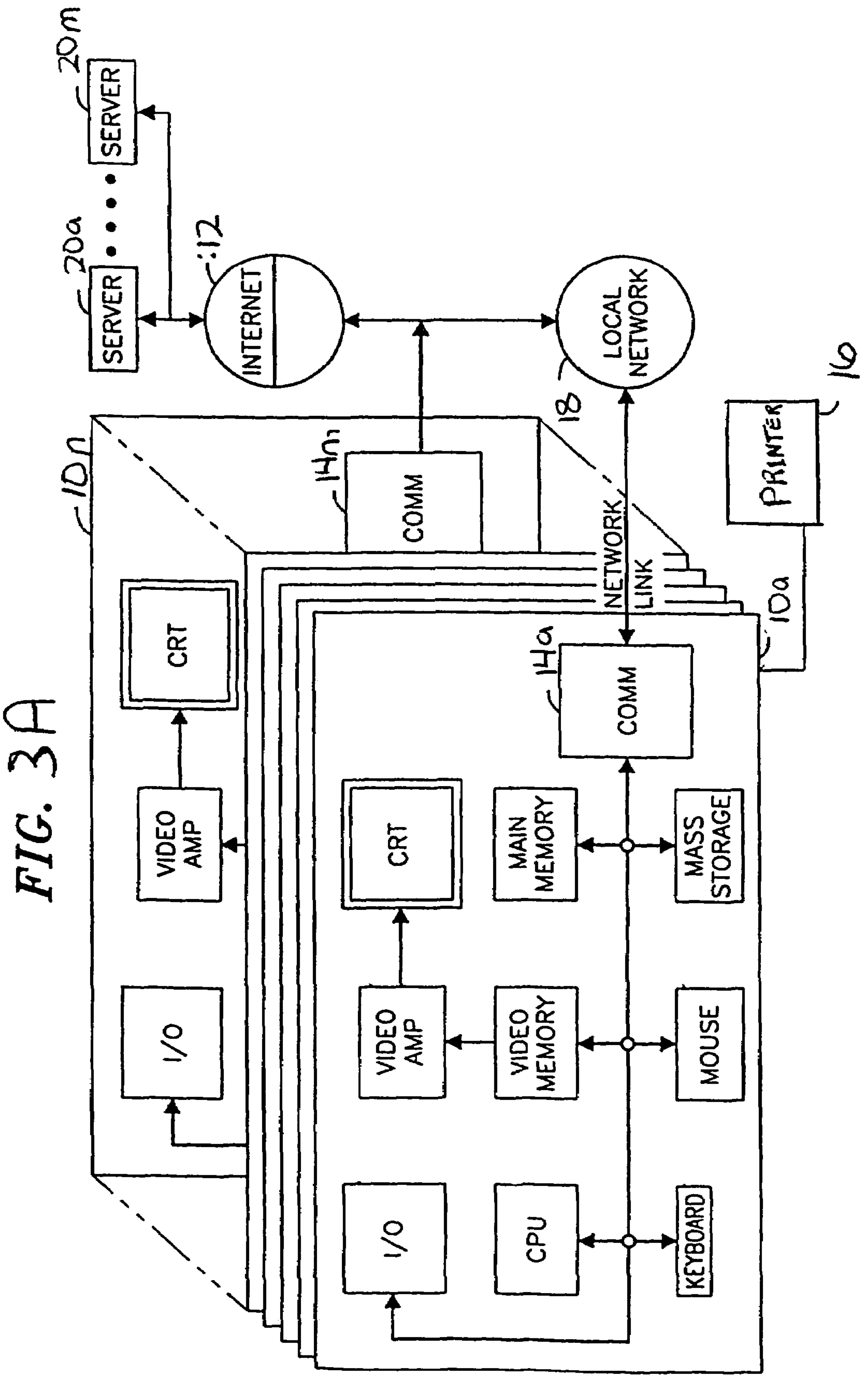
FIG. 3A is a block diagram of an Internet client/server environment used by an on-line postage system in one embodiment of the present invention.

FIG. 3 shows a block diagram of an exemplary Internet client/server environment used by the on-line postage system in one embodiment of the present invention. Personal computers (PCs) 10*a*–10*n* used by customers of the postage system may be connected to the Internet 12 through communication links 14*a*–14*n*. Each PC has access to a printer such as printer 16. Optionally, a local network 18 may serve as the connection between some of the PCs, such as the PC 10*a* and the Internet 12. Servers 20*a*–20*m* are also connected to the Internet 12 through respective communication links.

Printing postal indicia requires specific information about a user's printer and its associated printer driver. The servers 20*a*–20*m* include information and server based printer databases that is accessible by the PCs 10*a*–10*n*. The server based printer database may contain information, such as for example, model number, printer driver, print specifications (margins, etc).

Additionally, a client-based printer database, may be located on the user's machine. The client-based printer database may include a forms database that defines which media types are supported (e.g., envelopes, labels, postcards and the like) and the dimensions of each of these media. In an exemplary embodiment of the present invention the print engine accesses the forms database to locate and print the indicium, delivery address, and return address.

Figure 3B:
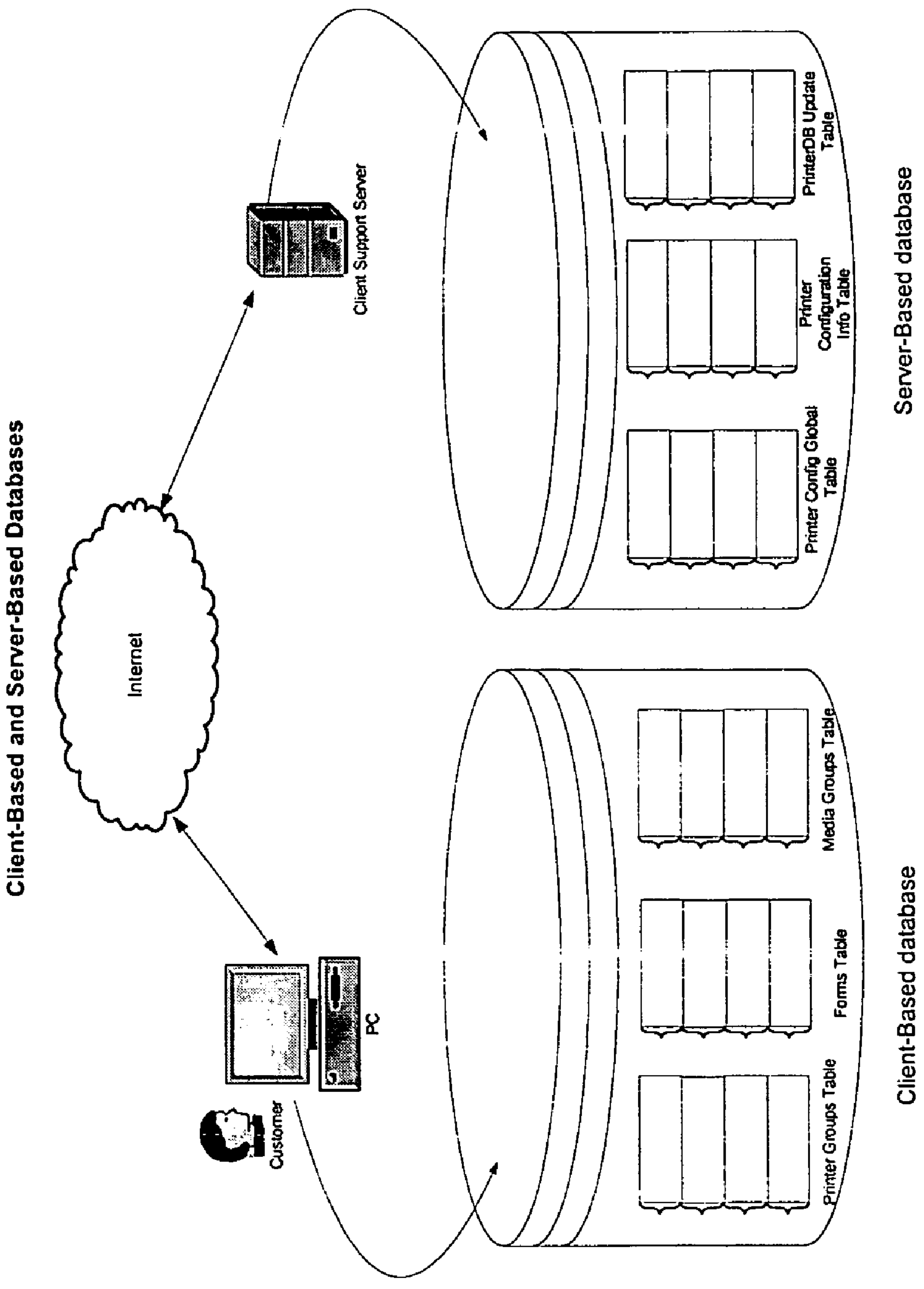
FIG. 3B is a simplified block diagram illustrating the tables used in server and client based printer database in accordance with an exemplary embodiment of the present invention.

Referring to FIG. 3B, when a user first tries to setup a printer with the client software, the server-based printer database is queried to determine if the user's printer driver information is contained within the database. If the printer information is in the database the required information is available and the user may continue. If the printer driver is not in the database, the user performs several tests to determine the required information with the guidance of a software wizard.

Figure 4:
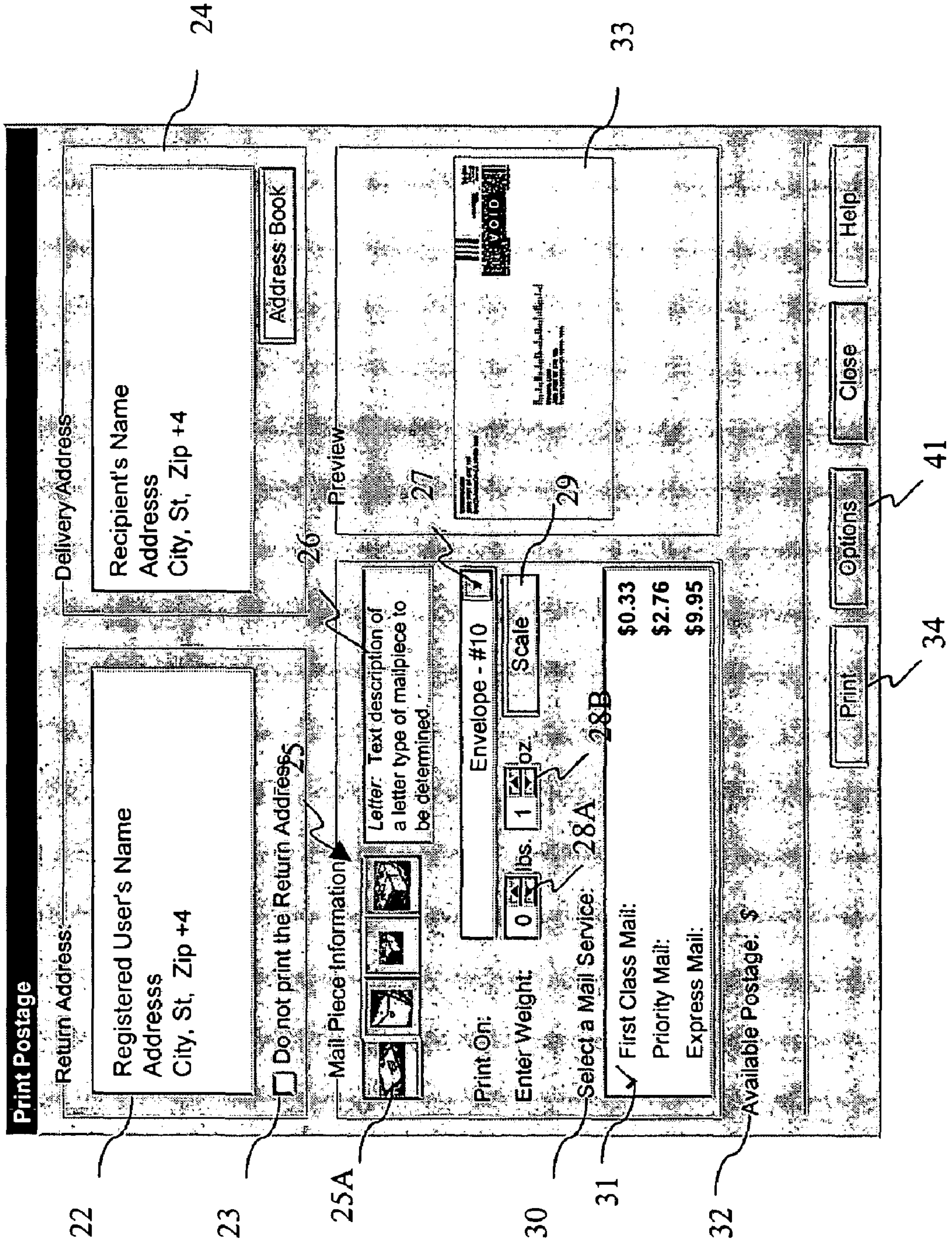
FIG. 4 is a capture of an exemplary print postage dialog screen for a single recipient in accordance with an exemplary embodiment of the present invention.

An exemplary on-line postage system preferably provides a print postage interface from which a user may define the postage that is to be printed. An exemplary print postage screen for a single recipient is shown in FIG. 4. The user may enter a return address by typing in a return address box 22. The user may omit the return address by activating a "Do not print the Return Address" option 23. The omit return address option is preferably not active by default. Similarly, a delivery address box 24 preferably allows users to enter a delivery address by typing in the delivery address box 24 or selecting an address from an address book. If a user enters an address which is not in the address book, an exemplary system preferably allows the user to enter the address in the address book. The system preferably displays the address of a single recipient in a format that is substantially the same as the format of the return address displayed in the return address window.

An exemplary print postage screen preferably provides a plurality of toggle buttons 25 that allow a user to select the type of mail piece to be sent, such as for example, a letter, flat, box or oversized box. The postage system preferably uses this information to determine what labels and/or envelopes are available to the user, and to establish the proper postage rate. A letter toggle button 25A is preferably active as the default mail piece type. A description box 26 preferably provides a brief description of the mail type that is currently selected by the mail type toggle buttons 25.

An exemplary print postage screen further includes a print on drop down box 27 which allows users to select from envelopes and labels. The items displayed in the drop down box 27 are preferably determined by the type of mail piece that was selected via the mail type toggle buttons 25. For example, if a letter is selected, only envelopes and labels approved by the USPS may be available in the print on drop down box 27. Similarly, if a flat or box is selected, only labels approved by the USPS for the selected flat or box may be available. An exemplary embodiment of the present invention does not incorporate a default print onto media.

An exemplary print postage screen allows a user to enter the weight of an item to be mailed into weight fields 28A, 28B. The dimensions of the weight fields may be for example pounds and ounces. An exemplary on-line postage system preferably allows users to integrate a digital scale into the postage system. The print postage screen preferably provides an interfaces to a digital scale. A scale button 29 on the print postage screen preferably allows for the automatic retrieval of the weight of the mail piece from the scale. The system preferably displays this weight in the enter weight fields 28A, 28B. A default weight is preferably 0 lbs., 1 oz. After the initial use, the fields preferably remember the last value.

A select service control box 30, preferably displays a plurality of available services as well as the cost of each type of service for the selected mail piece type. The prices preferably update as the user inputs information into the enter weight fields 28A, 28B. If the user is typing a value, the display may immediately update as the user types. The price may also update as a function of the delivery address of a mail piece. Once a user has selected a mail service, an indication, such as for example, a check mark 31 may appear adjacent to the selected service. An exemplary on line postage screen preferably does not select a default service type.

Figure 5:
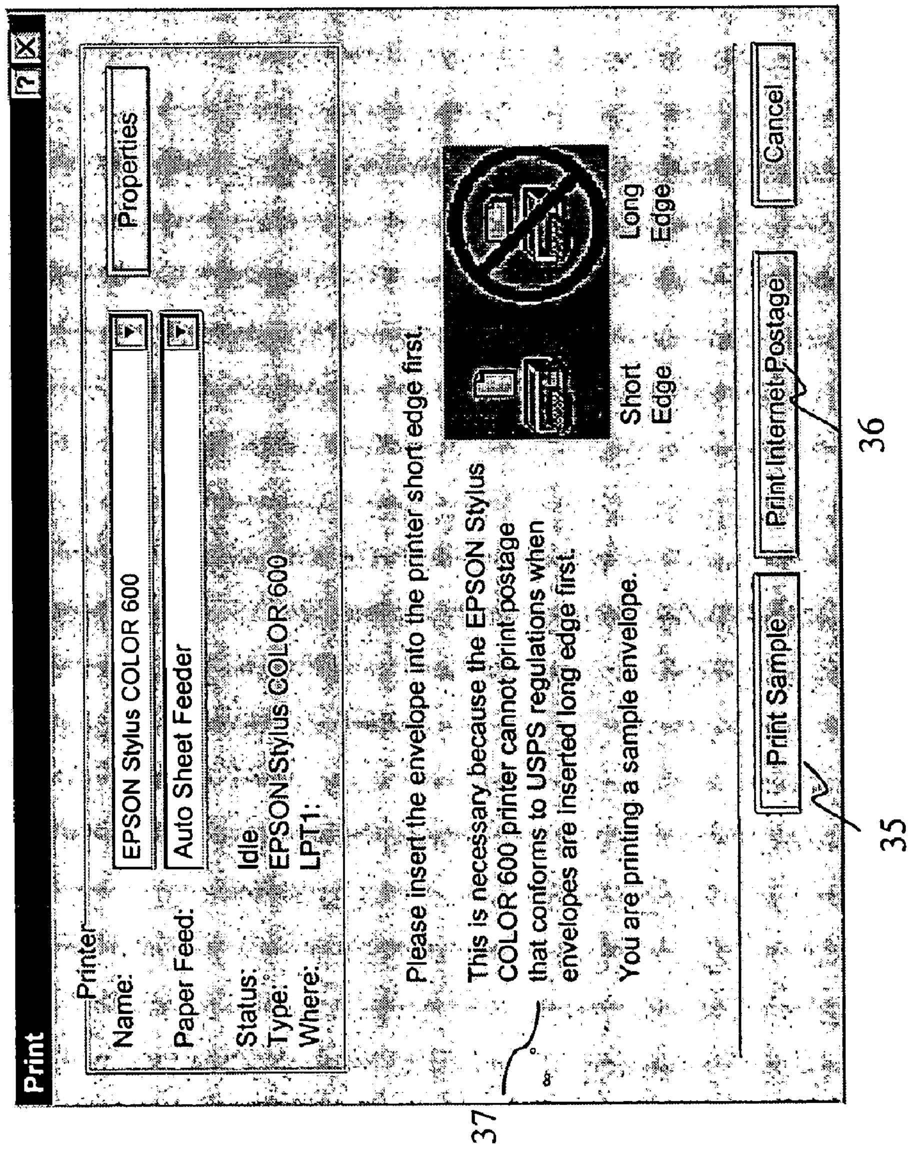
FIG. 5 is a capture of an exemplary print prompt screen that allows a user to edit the properties of the selected printer and decide whether to print sample or actual postage in accordance with an exemplary embodiment of the present invention.

Available postage 32 (reflecting the user's account balance) is preferably displayed on the print postage screen as is a print preview window 33. The print preview window 33 is preferably updated in accordance with the media type selected in the "print onto" box 27. The selection of a print button 34 preferably advances a user to a print prompt screen as shown in FIG. 5. An exemplary print prompt screen allows a user to edit the properties of the selected printer and decide whether to print sample 35 or actual postage 36. In addition, envelope feed-information 37 is preferably provided for the selected printer.

Figure 6:
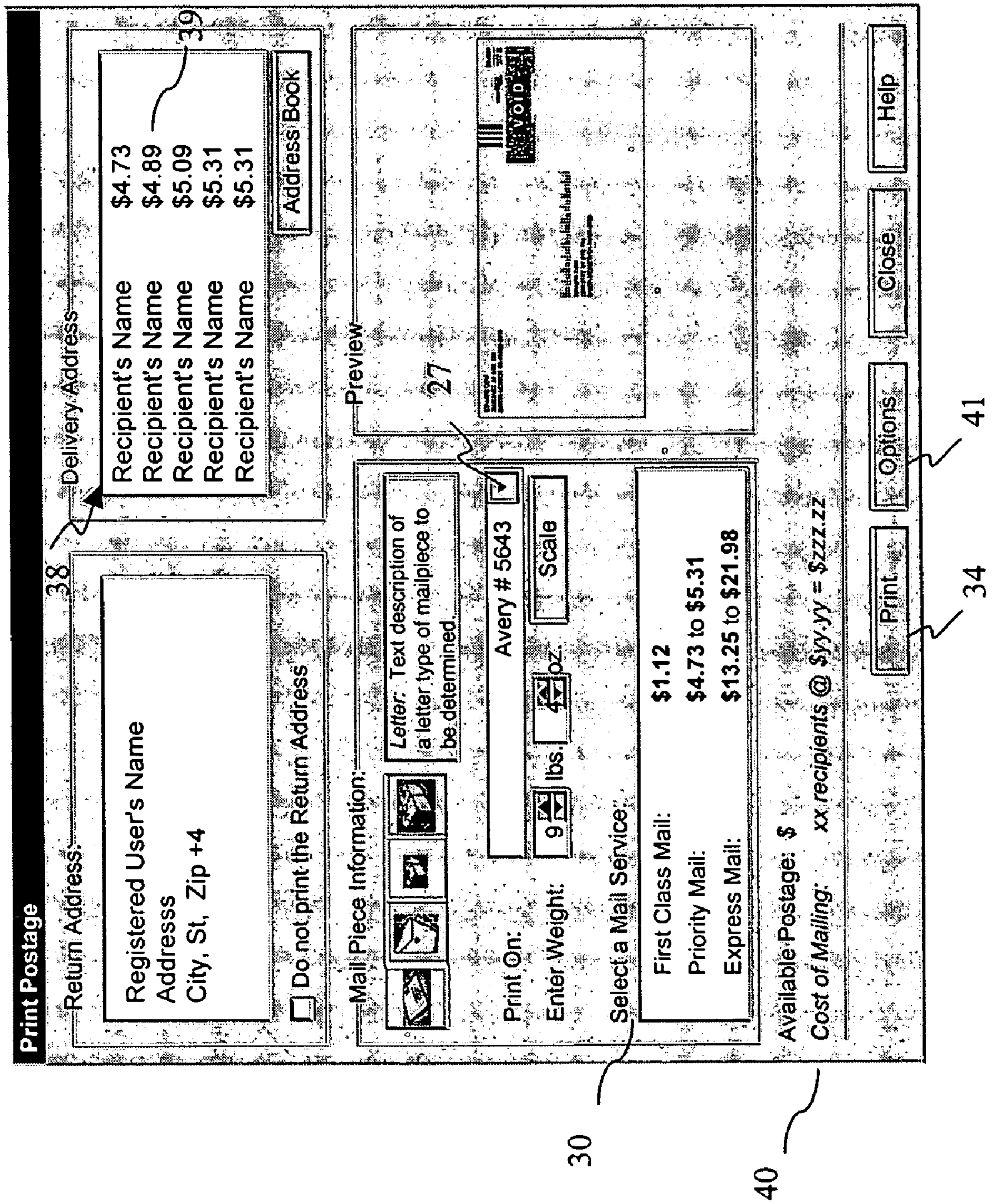
FIG. 6 is a capture of an exemplary print postage dialog screen for multiple recipients in accordance with an exemplary embodiment of the present invention.

If multiple recipients and or zone based postage rates are selected, the functionality of the print postage screen may change as shown in FIG. 6. When multiple recipients are selected, each recipient is preferably displayed as a list 38 with only the name of the individual recipients displayed. In addition, when multiple recipients from multiple zones are entered or selected, the price 39 of the mail piece going to the individual recipients may be displayed next to their name. This display preferably appears after a weight that warrants zone based postage has been entered. The select a mail service dialog box 30 preferably shows a range of prices for the plurality of mailings. A cost of mailing dialog box 40 preferably appears when multiple recipients are selected. The cost of mailing dialog box 40 preferably displays the total cost for the mailing.

Figure 7:
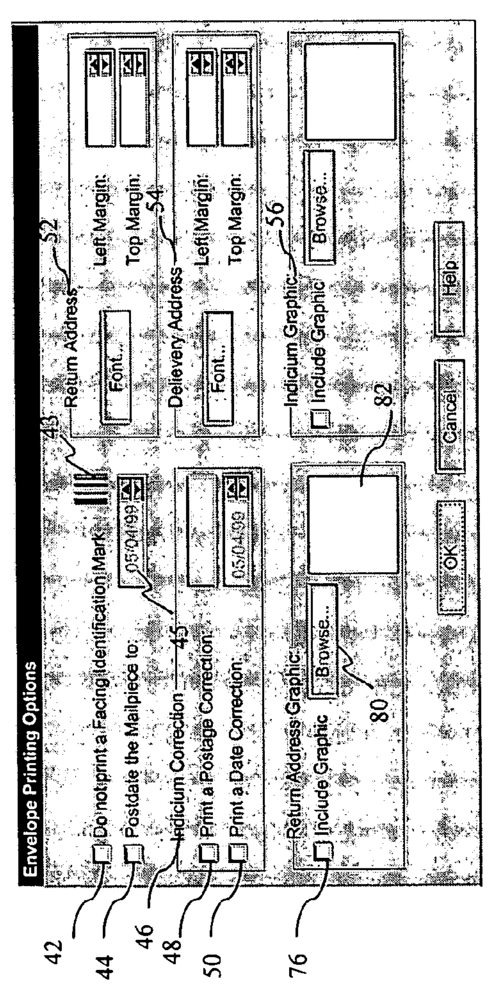
FIG. 7 is a capture of an exemplary envelope options screen in accordance with an exemplary embodiment of the present invention.

Selection of an options button 41 on the print postage screen preferably advances the user to an options dialog box, that corresponds to the media type selected in the print onto box 27. For example, if an envelope is selected in the print onto box, an envelope options screen as shown in FIG. 7 may be launched. An exemplary envelope options screen includes a control 42 to disable FIM barcode printing. This control preferably includes a graphic representation 43 of a FIM barcode to visually define the term FIM barcode. In addition, the envelope options screen preferably includes the ability to postdate a mail piece 44 by allowing a user to enter a date in a text edit box 45.

An exemplary envelope options screen further includes a plurality of indicium correction options 46, such as for example, printing corrected postage 48 or a corrected date 50. A return address graphic control 52 preferably allows the user to select a graphic to be printed with the return address. Return address adjustment controls 52 provide the ability to adjust a plurality of features including, for example, the font to be used in the return address and the margins. Delivery address adjustment controls 54 may also be included.

An exemplary envelope options screen also includes an indicium graphic control 56. The on-line postage service provider preferably controls the graphic that can be displayed within the indicium. Therefore, the online postage system preferably provides graphics for the indicium in a digitally signed format, embedded within a DLL. The system may also provide clip art that a user may browse to select the indicium graphics. The on-line system may provide for independent downloading of the DLL, so that a clip art library can be updated without forcing a complete download of the entire client software. If the DLL is not present, this control is preferably unavailable.

Figure 8:
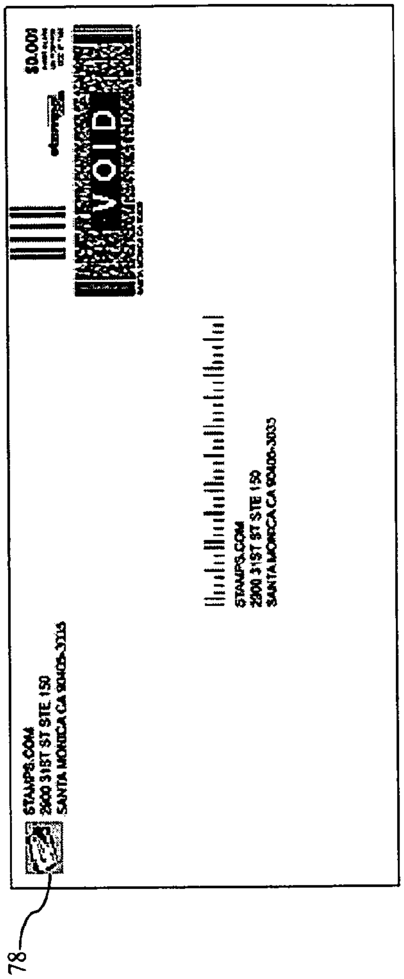
FIG. 8 is a plan view of an envelope with a graphic included in the return address area in accordance with an exemplary embodiment of the present invention.

The USPS regulations indicate that users may not incorporate a logo into the indicium without prior approval by the USPS. The USPS regulations greatly restrict a user's ability to customize the indicium. Therefore, an exemplary on-line postage service provides means by which users can customize their mail piece with a graphic file of their choosing. The envelope options screen preferably provides a return address logo control 76 which allows the user to incorporate a graphic 78 into the return address area (see FIG. 8). In an exemplary envelope options screen a logo is not incorporated into the return address area by default. A browse button 80 is preferably provided to allow a user to open a standard dialog box, from which a user may browse for and select a return address graphic. A preview window 82 provides a preview of the selected return address graphic. FIG. 8 illustrates the inclusion of a graphic 78 in the return address area of an envelope.

Figure 9:
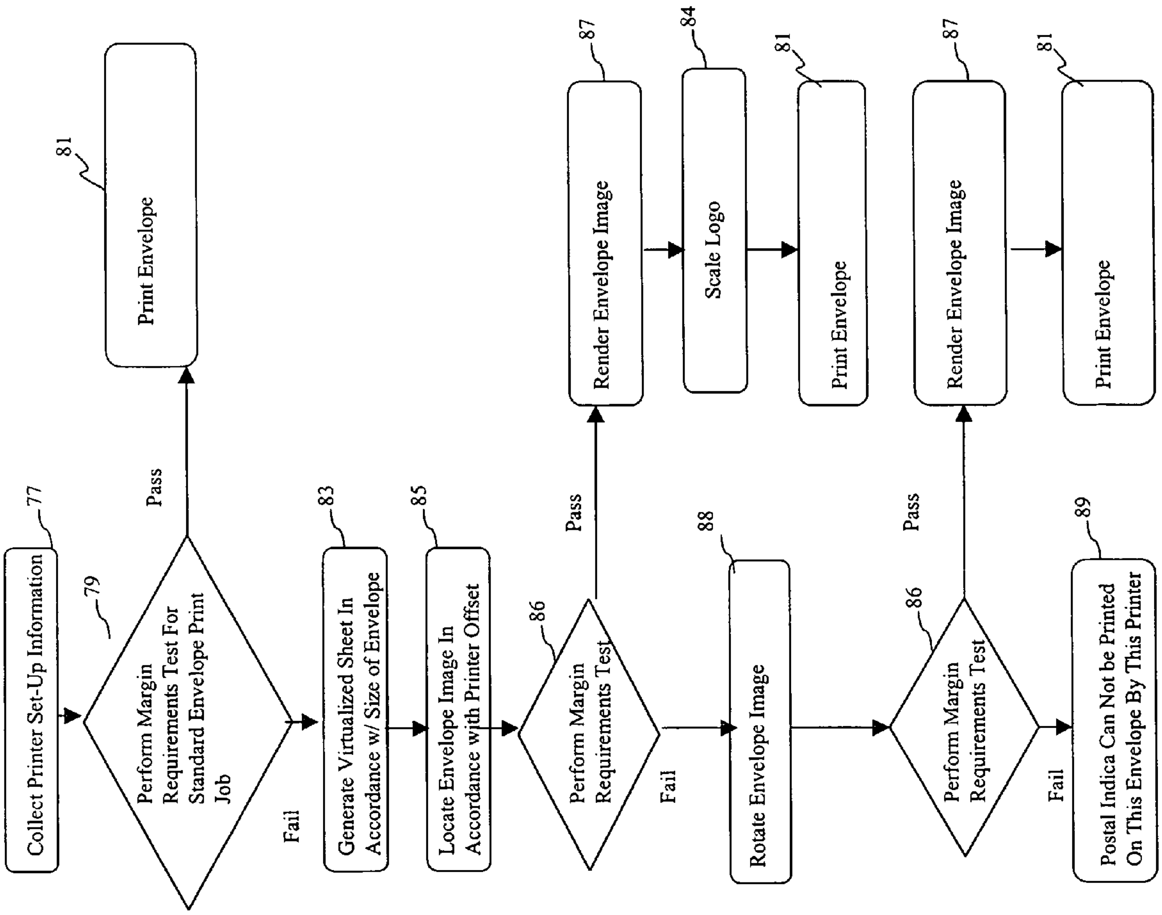
FIG. 9 is a flow chart demonstrating a process for printing postal indicia on envelopes in accordance with an exemplary embodiment of the present invention.

Referring to FIG. 9, the present invention utilizes a combination of processes to print postal indicia onto envelopes in accordance with the regulations set forth by the USPS. In an exemplary embodiment of the present invention, the process of printing postal indicia begins with the characterization of a default printer through the collection of set-up information regarding that printer's performance characteristics and default settings 77. Set-up information may include for example, how the printer rotates into landscape mode, what print media/paper the printer supports, what feed tray options the printer supports or other default information.

In an exemplary embodiment of the present invention, the client software may gather set-up information through database queries or manually with the use of a printer configuration software wizard. An exemplary embodiment of the present invention creates a dynamic database that alleviates the need to require all users to provide specific information about their printer. The dynamic printer database may be updated for the entire user community whenever a user manually sets-up a new printer. In one embodiment, the dynamic database may be maintained on the server of the postal provider. The dynamic database may contain information, such as for example, model number, printer driver, print specifications (margins, etc) and which media the printer is allowed to support as well which media the printer is not allowed to support. This allows the postal provider to remotely control the type of media and printers that are or are not available for use.

The server-based printer database may use a plurality of tables in a user support database to store information about printer drivers. For example, a printer configuration information table may be used to store information on known printer drivers (printer drivers that have been tested successfully, either in house or by a consensus of users' results) and the print media they support. Similarly a printer global configuration table may be used to store settings that affect all printer drivers, both known and unknown, and a printer database update table may be used to store the results generated when a customer configures a previously unknown printer.

In addition to these tables, information that is specific to a customer's printers (i.e. driver version numbers, whether or not a printer has been configured, etc.) may be stored in the Registry. Each time a user logs into the postal service using the client software, a plurality of information is preferably sent to the postal service provider over the Internet. For example, the most recent date when the printer information in the Registry was updated with the printer information from the server based printer database may be sent. In addition, the names of printer drivers and printer driver version numbers that are installed on the user's computer are also preferably sent to the postal service provider.

The latest update or server date represents the date when the server-based printer database was last updated. If the date in the Registry is more recent than this server date, then the server does not update the printer information in the client based printer database. If the date in the Registry is earlier or the same as the server date, then updated printer information from the server-based printer database may be returned to the client based printer database. The client software then preferably updates the printer information in the Registry and updates the date information with the current system date.

The latest update value is preferably updated each time the Registry information is compared with the server information. The print engine preferably uses the information in the Registry along with the aforementioned tables in the client support database to determine which printer drivers are available for use as well as the print media that may be supported by each of the available printers. If a user works offline, the client software may use Registry values without being connected to the support server to access the server-based printer database.

The printer configuration information table is the main table in the print server database. It contains information on 1 printer drivers, such as for example, the version number, compatible operating systems, and the print media the drivers support. The printer configuration information table may also store the lowest version of the printer driver that meets all the criteria in the table. The printer engine compares the driver version number of a user's printer with the driver version(s) listed in the database. The printer engine preferably breaks up the string based on punctuation and then compares the numerical groups. If letters are included in the driver version, the engine does a character by character comparison.

The printer configuration information table may also store an offset or shift code for the default paper feed tray supported by this driver. The shift code represents how the guides of the paper feed trays are moved to properly feed envelopes into the printer. The shift code tells the printer engine where to place the image on the larger virtualized sheet of paper. If the printer does not shift the image at all, this value is preferably set to zero. If the printer shifts the image to the middle of the page, this value is preferably set to one. If the printer shifts the image across the page, this value is preferably set to two. A print test may be run to determine the proper shift code.

The printer configuration information table stores a variable indicating whether a given print driver supports virtualization and printing on envelopes as well as non envelope print media such as, for example, post cards or labels. If a user attempts to print to a print media not supported by the selected printer, the system preferably informs the user that their printer does not support the selected print media and allows the user to select a new printer or select a new print media.

The print media fields in the printer configuration information table are designed to handle cases where the majority of printer drivers support a print media. For example, while the majority of printer drivers support personal envelopes, some do not. In these instances, the personal envelope may still be an option in the "print on" list in the print postage screen. The system preferably notifies user's who attempt to print to a print media that is not supported by their printer driver, that the selected printer does not support that print media.

The printer configuration information table may also contain a horizontal page offset variable which is utilized when an image is shifted to the right or left on a label by a minority of printers but is otherwise properly printed onto the label by a majority of printers. If this occurs, the image may be translated by the horizontal page offset variable which represents the distance that the image should be shifted to properly print on the label. Negative values may be used to move the image to the left and positive values may be used to move the image to the right.

Similarly, a vertical page offset value may be stored to compensate for printers that require the user to move one of the paper feed guides a fixed distance and then to move the other paper feed guide as needed to fit an envelope. This may result in the default shift code being reported as a one when it's really a zero or as a two plus the distance that you are required to move the fixed paper guide. When envelopes are printed, the information may be shifted up or down (the same distance as the fixed-distance paper feed guide) and printed incorrectly on the envelope. To compensate for this problem, the system preferably stores the distance the image should be shifted in order to print correctly. Printing on the envelope may be raised, for example, by storing a negative value and lowered by storing a positive value.

A landscape orientation variable may compensate for printer drivers that over rotate the image, which would otherwise result in the image being shifted horizontally across the page.

The printer global configuration table may be used to control printer driver settings. The setting of a global variable allows unknown printers and determines if printer drivers that are not in the database will be supported. If unknown printers are not allowed, the system preferably does not allow a user to configure an unknown printer in a getting started wizard. Rather the system preferably notifies the user that the selected printer is not supported.

Similarly, the system will not allow a user to select an unknown printer in a print postage screen. In addition, the setting of a global FIM specification mode variable, determines the distance from the top of an envelope a FIM may be printed when virtualization is not used. DMM regulations require that the FIM be no lower than 0.125" from the top of the envelope. This field may be set to allow the FIM to print in accordance with the DMM regulations unless the regulations regarding FIM placement change.

When a client configures a printer, the results of the configuration may be saved in the printer database update table. As a result, this table contains information about both known and unknown printer drivers so that there is overlap between the fields of this table and the fields in the printer configuration information table. The information in the overlapping fields for a new printer driver may be transferred to the printer configuration information table after numerous customers, on the order of five to twenty, have successfully configured the printer driver with the same operating system, version number, and shift code.

The system preferably stores a user identification to identify the user that configured the printer driver in this record. This identification is preferably a unique number assigned to a user when they registered with the on-line postal provider. The printer database update table may store the text name of the printer driver that the user configures, the driver version, the computer operating system used when the printer driver was configured and the date the driver was configured.

Additionally, a client-based printer database, preferably located on the client's machine, may include a forms database. The forms database defines which media types are supported (such as, for example, envelopes, labels, postcards and the like) and the dimensions of each of these media so that the printing engine knows where and how to print the indicium.

The forms database preferably stores one record, with a unique identification, for every print media that the system supports. The database preferably identifies the print media as being either an envelope or a non-envelope type. The type value tells the print engine which fields it needs to look at in the record. These records correspond to the print on options displayed on the print postage dialog screen in the client software.

An exemplary embodiment of the present invention prints on envelopes in accordance with, by way of example, the DMM regulations (e.g., FIM size, placement, the maximum size of the return address, etc.). However, for labels, the system preferably prints in accordance with the label-specific fields in the forms database, for example the fields that define the location for the indicium, return address, and the delivery addresses. The forms database allows each media type stored in the database to be individually enabled or disabled. The system may enable a media type when the media type is first created.

A paper height variable may be used to identify the size of the print media. The paper height variable includes the height of the media in standard units such as for example "mils" (1/1000th of an inch increments). Paper height is measured based on the entire length of the media from top to bottom. The paper height variable preferably includes non-printable borders on label sheets or other print media.

Similarly, a paper width variable may be used to identify the width of the print media. Again, an exemplary paper width variable includes the entire width of the media from left to right. Also, the forms database preferably includes a paper source variable to assist the operating system to interpret the size of the print media. This field may be for example the standard Windows® code for a paper size.

In addition, the system may assign a name to custom paper sources, such as for example a custom label supported by a label printer driver. The client based printer database may include printer groups which group drivers that support a media group. The group drivers may contain the names of the printer drivers that support specific print media. A variable may be included for each driver in a group documenting whether the printer driver supports envelope printing.

An exemplary embodiment of the present invention utilizes the printer set-up information to perform a margin requirements test to determine whether the printer in use can print postal indicia in accordance with USPS regulations 79. If the default envelope margin size for the printer in use satisfy the margin requirements the envelope is printed 81. If the default envelope margins do not satisfy the margin requirements an exemplary embodiment of present invention utilizes a virtualized printing process to print postal indicia within the USPS guidelines for PC postage. The client software determines the optimal size 83, location, and orientation to map an image of an envelope onto a virtualized sheet. An exemplary virtualization process preferably supports a plurality of virtual sheet sizes including for example 8½"×11", B5 (182 mm×257 mm), or 11"×17". The size of the virtualized sheet may be determined by the size of the envelope.

Figure 10:
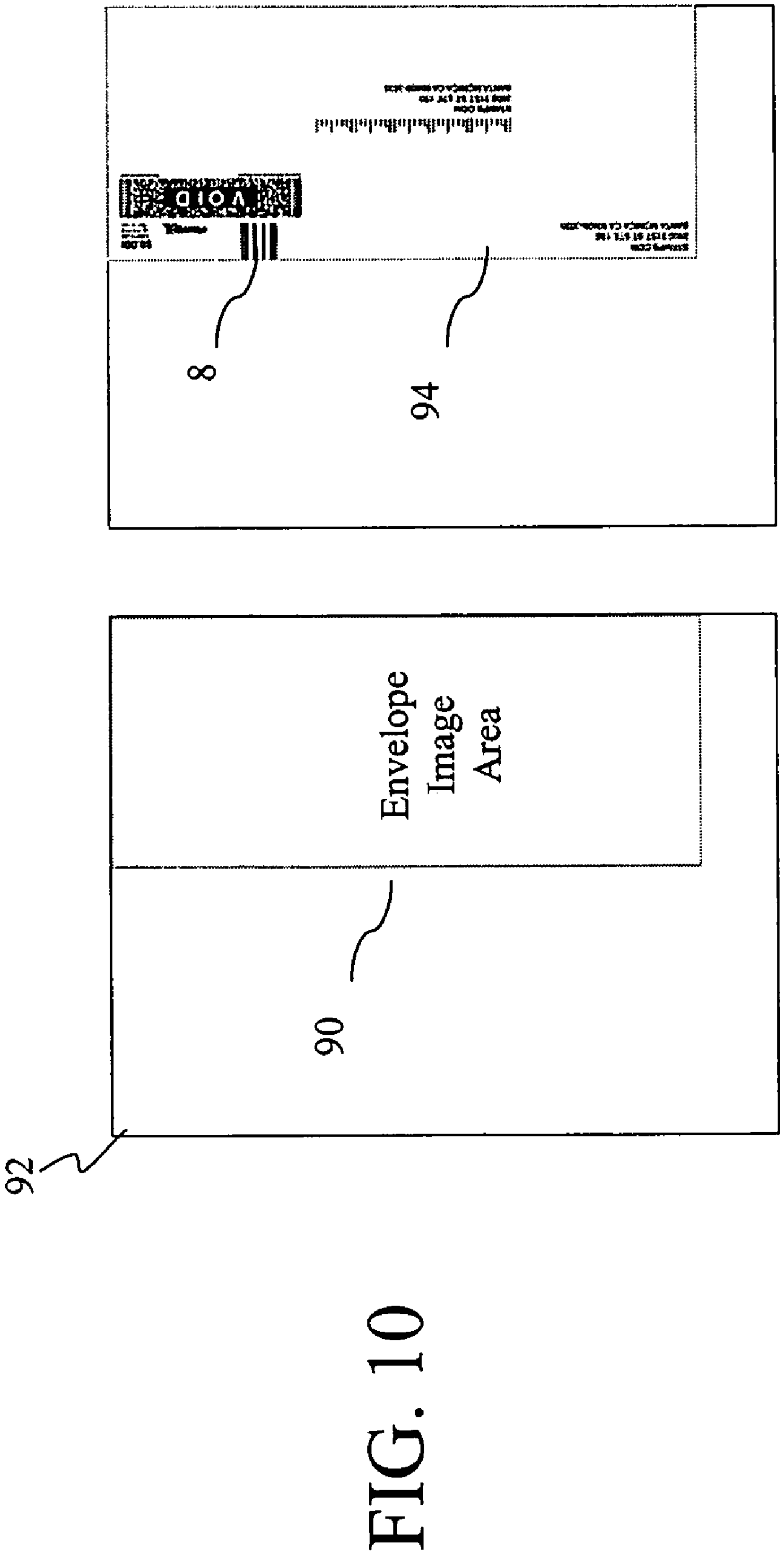
FIG. 10 is a plan view of an envelope demonstrating a virtualization process that re-formats an envelope print job into a print job for a virtual sheet of paper in accordance with an exemplary embodiment of the present invention.

Referring to FIG. 10, an exemplary virtualization processes ensures that the envelope image is contained within a "envelope image area" 90 of the virtualized sheet 92. Thus, even though the user inserts an envelope 94 into the printer, the exemplary software preferably sends print commands to the printer for a virtualized sheet 92.

Figure 11:
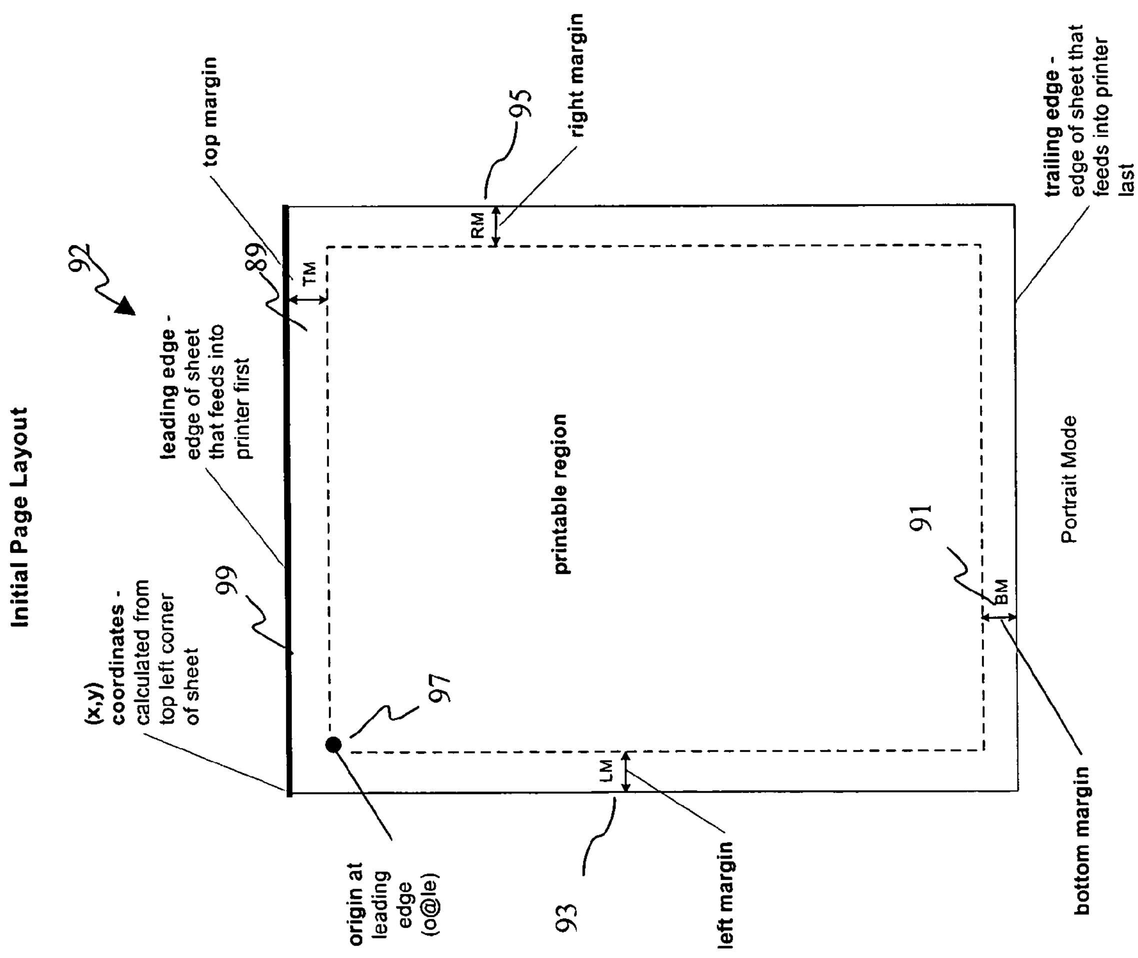
FIG. 11 demonstrates a page layout determining the printable region for a virtualized sheet in accordance with an exemplary embodiment of the present invention.

Referring to FIG. 11, the printable region (the area within the dashed lines) of a virtualized sheet 92 may be determined by four margins, namely the top margin 89, bottom margin 91, left margin 93 and the right margin 95. In addition, an exemplary system defines an origin point 97 for the virtualized sheet 92. The origin point 97 is preferably used to calculate the location of the image within the printable region. In portrait mode the edge of the paper that feeds into the printer first is known as the leading edge 91. In portrait mode the system preferably places the origin point 97 at the left corner of the leading edge of the virtual sheet. If the print job is rotated into landscape mode, the system moves the origin to the opposite edge of the sheet, known as the trailing edge.

Printer virtualization preferably orients the FIM barcode near the middle of the virtualized sheet thereby alleviating any physical margin constraints that might otherwise prevent a printer from printing the FIM barcode within 0.125" from the top of the envelope. In fact, the use of print commands for a virtualized sheet may allow the FIM barcode to be printed up to the edge of the envelope.

Printer offset or shift code is a variable dependent upon how an envelope is fed into a printer. Referring back to FIG. 9, the client software uses the printer offset to locate the envelope image with in the printable region of the virtualized sheet 85. Envelopes are fed into printers by means of feed trays. Feed trays typically have guides that align the print media to prevent it from skewing. However, the location of the feed tray and the way in which the envelopes are loaded may vary from printer to printer. Therefore, the printer offset variable may also vary from printer to printer.

Figure 12:
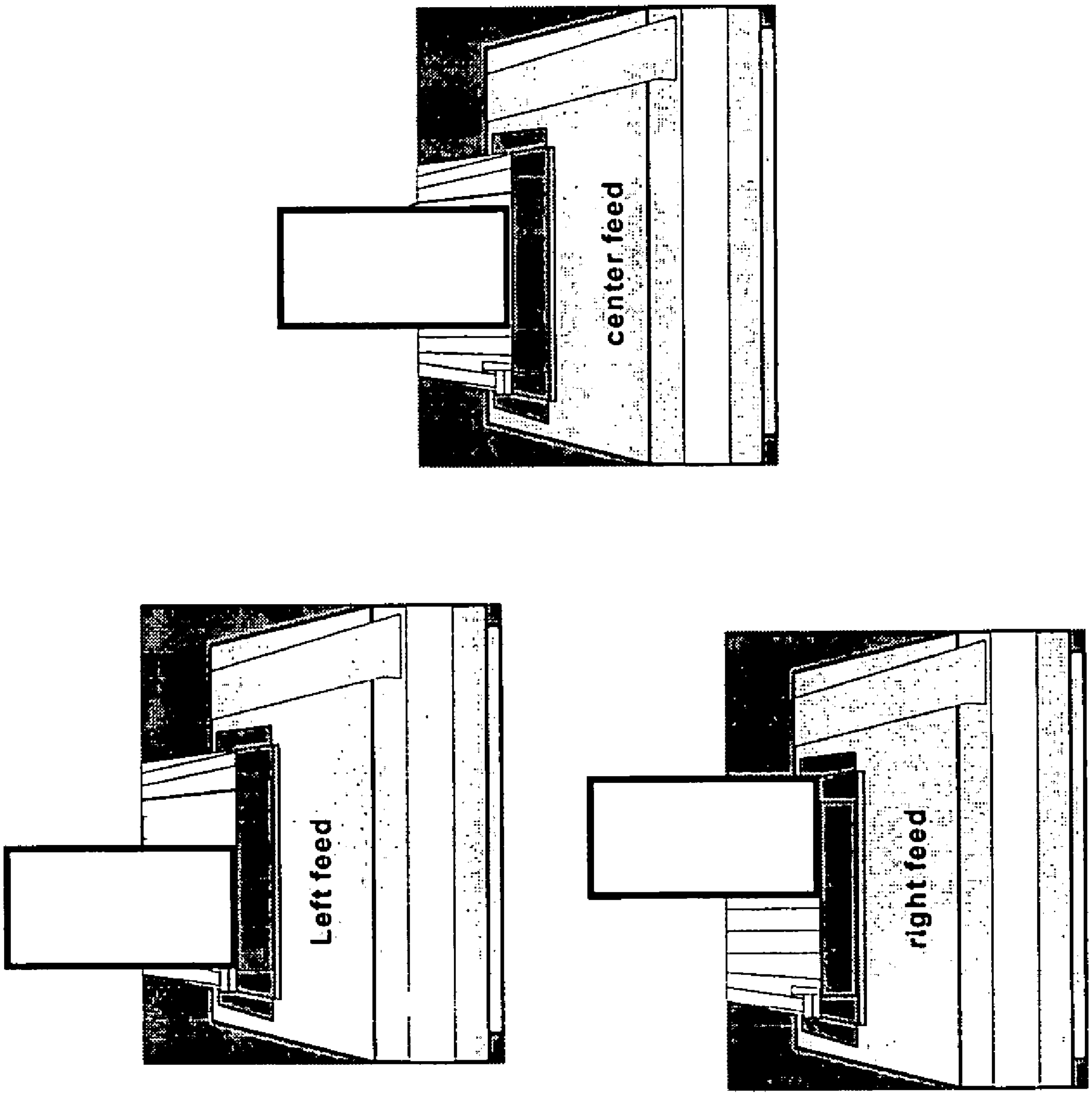
FIG. 12 demonstrates envelope feed positions for a typical printer.

For example, referring to FIG. 12 the paper guides may load the envelope from the left, right, or center of the feed tray. In addition, the feed trays can be physically located in various places on the printer, for example on the top, front, back, or sides of the printer. The different locations of the feed trays make it difficult to classify printers (that don't feed from the center) as left or right. Therefore, an exemplary embodiment of the present invention classifies printer offset in terms of top and bottom offsets rather than left and right.

Figure 13:
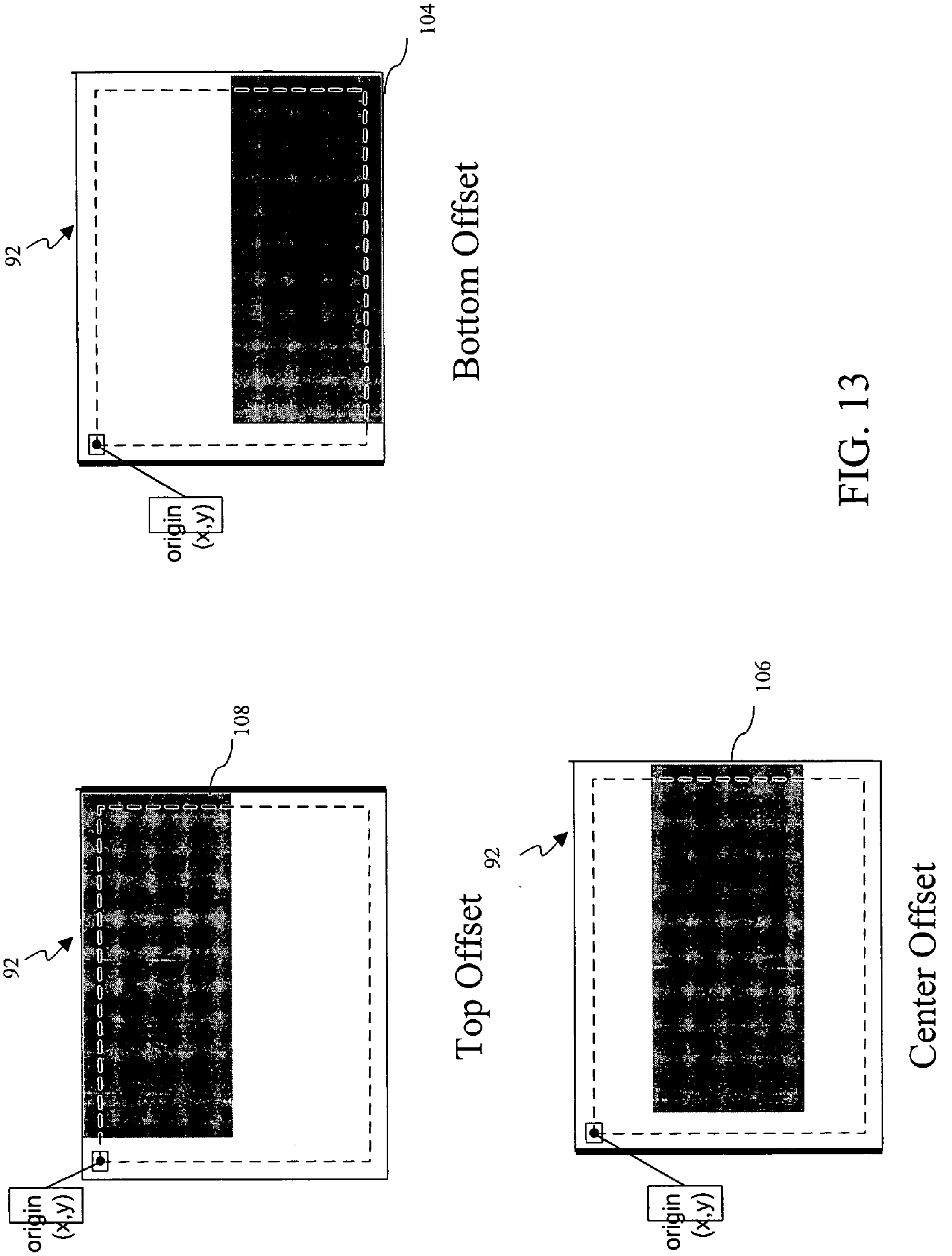
FIG. 13 is a plan view of virtualized sheets demonstrating offsets of the printable region in accordance with an exemplary embodiment of the present invention.

In an exemplary embodiment of the present invention the origin or reference point for the virtualized sheet is used to calculate the location of the envelope image. Referring to FIG. 13, printer offset may then be defined in terms of the vertical relationship between the envelope image and the origin of the virtualized sheet. If the set-up information on the print driver of the user's printer was not in the dynamic printer database, an exemplary embodiment of the present invention utilizes a wizard program to initially determine printer offset. The wizard program preferably generates one or more test shapes that are printed on a test envelope by the user's printer. Printer offset may then be defined by determining which of these shapes actually gets printed onto an envelope, (i.e., whether it is a top 108, bottom 104, or center 106 offset).

Once an offset is determined for a given printer the offset is preferably stored in the dynamic printer database so that future users who have the same printer may not have to exercise the wizard program to determine the printer offset. Rather, future users preferably obtain the offset information from the dynamic printer database. Once the system determines the offset, the envelope image may be located within the printable region of the virtualized sheet.

Portrait mode is the default orientation of a normal print job. However, since envelopes are typically printed in landscape mode the system software preferably modifies the printer setting from "portrait" to "landscape" mode. Printers handle the landscape mode in different manners. Some printers rotate the portrait image 90° to create a landscape image while others rotate the portrait image by 270°. Therefore, the ultimate location and orientation of the envelope image within the printable region of the virtualized sheet depends on the rotation undertaken by the printer to achieve landscape mode.

Referring back to FIG. 9, when the envelope image is properly located in the printable region of the virtualized sheet in accordance with the printer offset, the client software again performs a margins requirements test to determine whether the printer in use can print postal indicia in accordance with USPS regulations 86. If the margins for the virtualized sheet satisfy the margin requirements the client software uses rendering algorithms 87 to relocate the origin of the virtualized sheet to print the postal indicia onto the envelope 81.

As part of the rendering process, an exemplary embodiment of the present invention may incorporate a logo of the postal service provider in the postal indicia. Rather than integrating a single, static logo, the print engine preferably accommodates a scalable logo 84. In order to conform to the FIM placement standards which require that the FIM consistently be printed 2"+/−⅛" from the right-hand edge of the envelope, the space available between the FIM and the human-readable portion of the indicium changes depending upon the right-had margin of the printer.

Figure 14A:
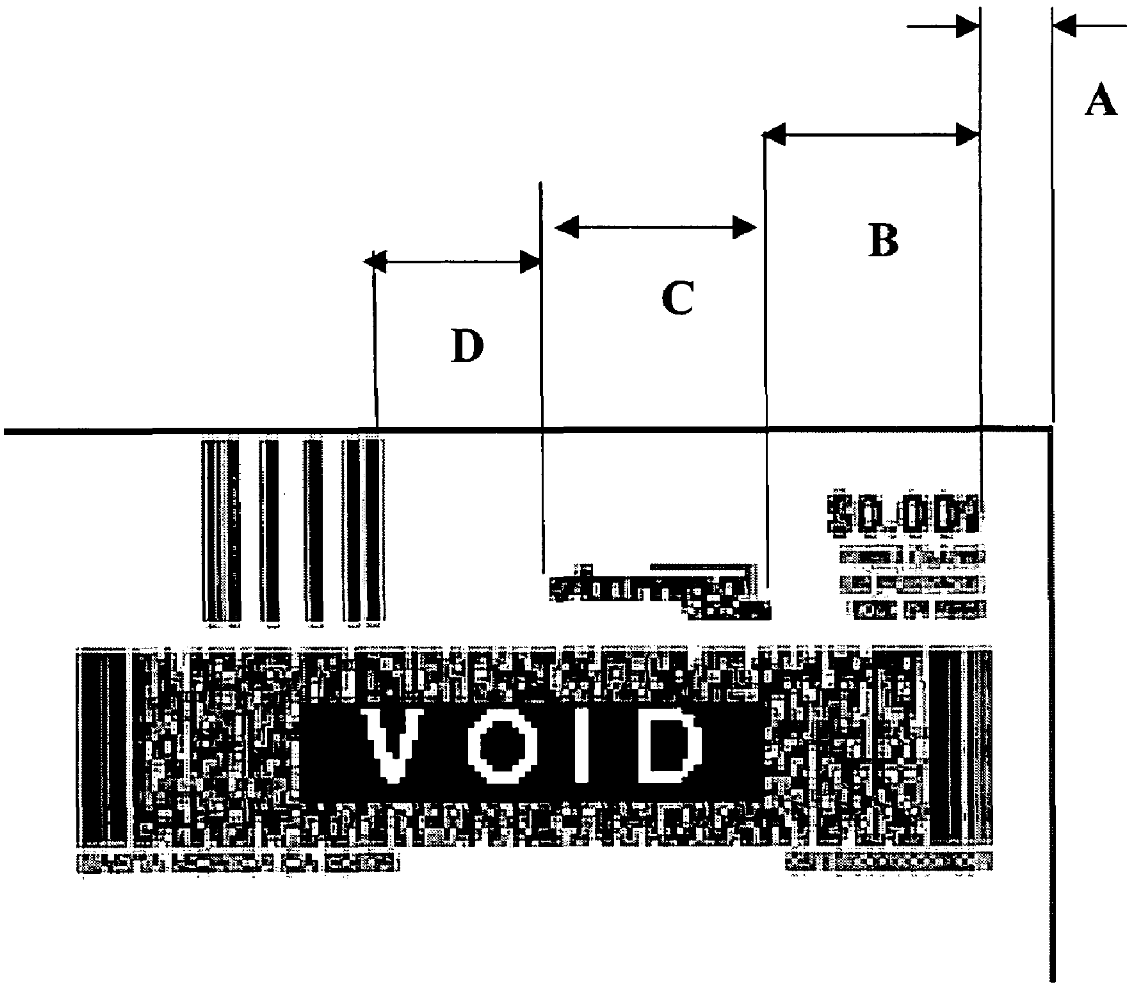
FIG. 14A is a plan view of an envelope with a FIM barcode printed in accordance with the USPS requirements which defines distinct sections between the right hand edge of the envelope and the FIM barcode in accordance with an exemplary embodiment of the present invention.

Referring to FIG. 14A the area between the right edge of the FIM barcode and the right hand edge of the envelope can be divided into a plurality of distinct sections, described as follows:

"A" is the distance from the edge of the indicium to the edge of the paper. In many cases, this distance is determined by the physical margin of the printer, and is therefore a variable amount.

- "B" is the width of the human readable portion of the indicium. This width is preferably fixed.
- "C" is the width of a logo graphic. This width may be variable.
- "D" is the width of a FIM clear zone. Its width should also be fixed.

To satisfy the requirements promulgated by the USPS the distinct sections involved in locating the FIM barcode from the right hand edge of the envelope may be constrained as follows:

$$1.875'' < A+B+C+D < 2.125'' \quad (1)$$

Since B, the width of the human readable portion, and D the width of a FIM clear zone are preferably fixed, the system preferably reduces the size of C (the logo)when A (the printer margin) increases, to satisfy the above equation. Similarly, when A (the printer margin) decreases, the system preferably increases the size of C (the logo) so as to increase the branding within the indicium. A right hand margin (A) of about 7/10" or less allows the client software to print a logo (C) in the postal indicium. Generally, for a particular printer, the logo size will be constant for all envelope jobs.

Figure 14B:
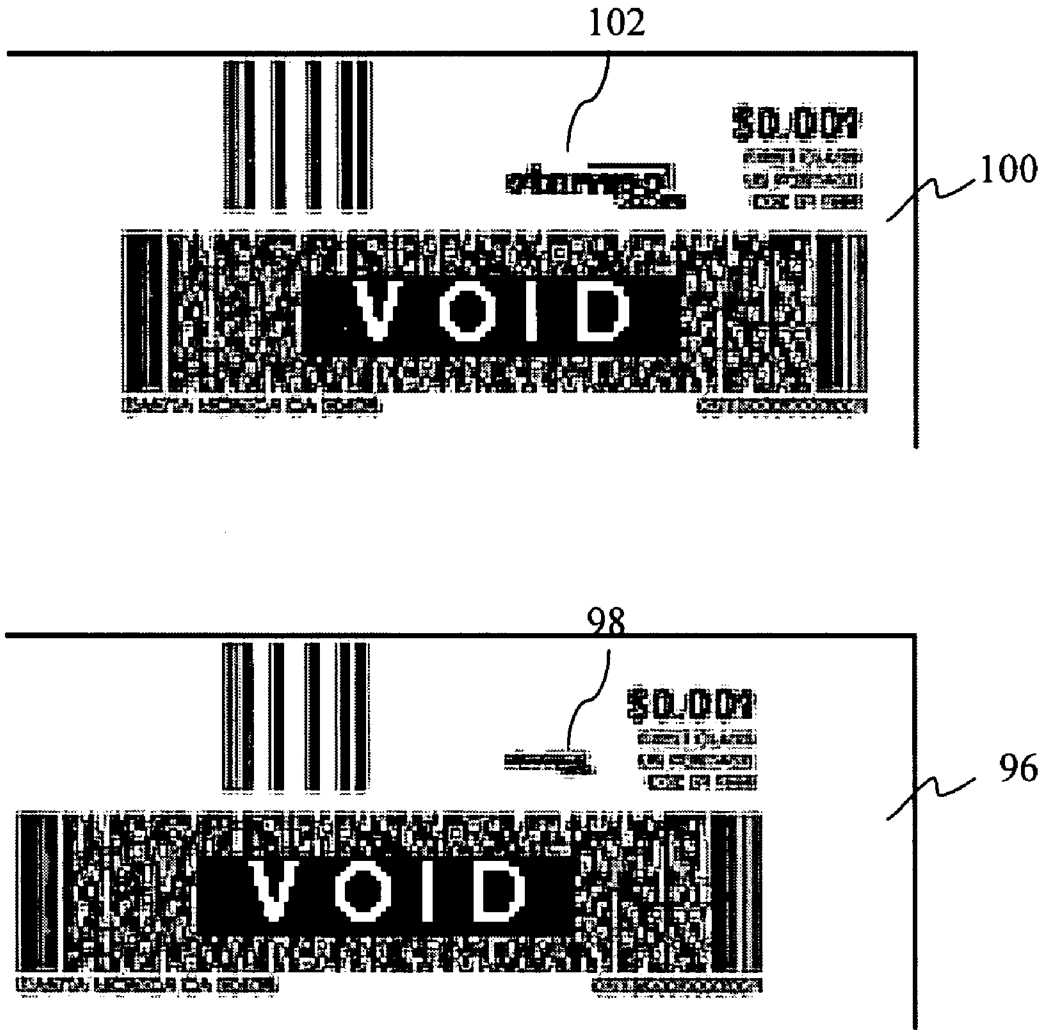
FIG. 14B is a plan view of an envelope with a FIM barcode printed with a large right hand margin and a small logo as well as a small right hand margin and a large logo.

An exemplary embodiment of the present invention shifts the human readable portion in accordance with the printer margin and scales the logo in a manner that maximizes the size of the logo while preserving the validity of the equation above. Referring to FIG. 14B, when a large printer margin 96 is required, a small logo 98 is preferably printed. Similarly, when a small margin 100 is allowed, the human readable portion shifts towards the edge of the envelope and a larger logo 102 is preferably printed. The latter is generally preferable since it provides more prominent branding and is considered more aesthetically appealing to the user.

Figure 15:
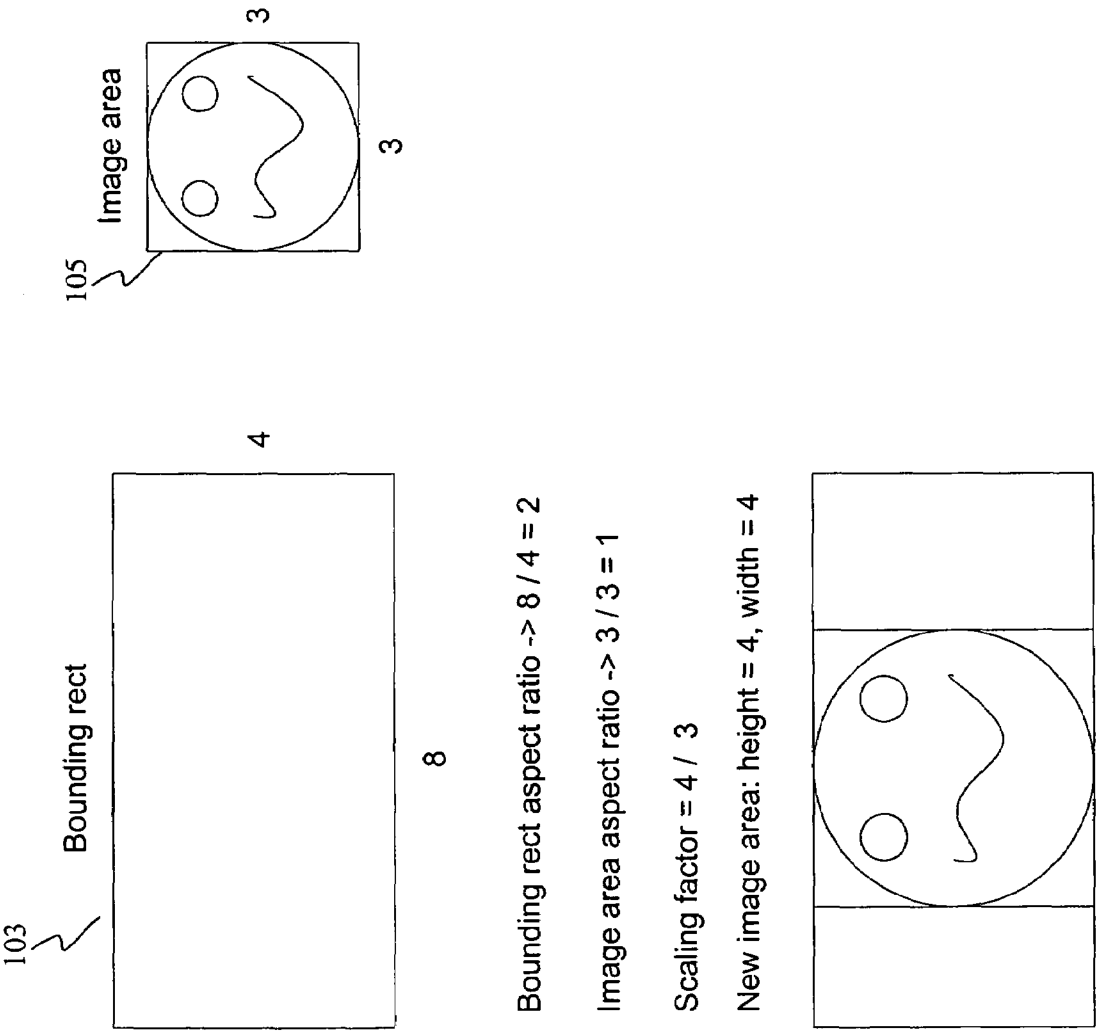
FIG. 15 is diagram illustrating operation of a rendering algorithm to scale the logo as a function of the aspect ratio of a printable bounding area in accordance with an exemplary embodiment of the present invention.

Referring to FIG. 15, an exemplary rendering algorithm for scaling the logo while maintaining the validity of Equation (1) above defines a printable bounding area 103 or a bounding rectangle and scales the logo to fit into the printable bounding area. Referring back to FIG. 14, the width of the printable bounding area is the distance between the human readable portion and FIM clear zone. The height of the printable bounding area is equal to the distance between the two dimensional bar code and the edge of the print media.

Referring back to FIG. 15, in operation the described exemplary rendering algorithm determines the aspect ratio (defined as the width/height) of the bounding area as well as the aspect ratio of an image area 107 that bounds the logo. If the aspect ratio of the bounding area is greater than the aspect ratio of the image area the rendering algorithm may scale the image to fill the printable bounding area. The rendering algorithm may create a vertical scale factor, defined as the height of the bounding area divided by the height of the image area, and scale the image vertically by multiplying the image height by the vertical scale factor. Further the rendering algorithm may create a horizontal scale, factor defined as the width of the bounding area divided by the width of the image area, and scale the image horizontally by multiplying the width of the image area by the horizontal scale factor.

An exemplary rendering algorithm for scaling the logo may best be demonstrated with an example. Therefore for purposes of illustration only, assume a printable bounding area has a width equal to eight and a height equal to four and therefore an aspect ratio of two. Further assume an image area has a width of three and height of three and therefore an aspect ratio of one. In this instance the vertical and horizontal scale factors are equal to 4/3 so that the image area may be scaled horizontally, vertically or both with a scale factor of 4/3.

Referring back to FIG. 9, if the margins for the virtualized sheet do not satisfy the margin requirements an exemplary embodiment of the client software rotates the envelope image one hundred and eighty degrees 88. In these cases, the client software preferably queries the server based printer database to determine if the user's printer and print drivers are capable of error free rotation. The system preferably limits rotation to cases where the server based printer database certifies that the printer and print drivers support rotation without error.

Figure 16A:
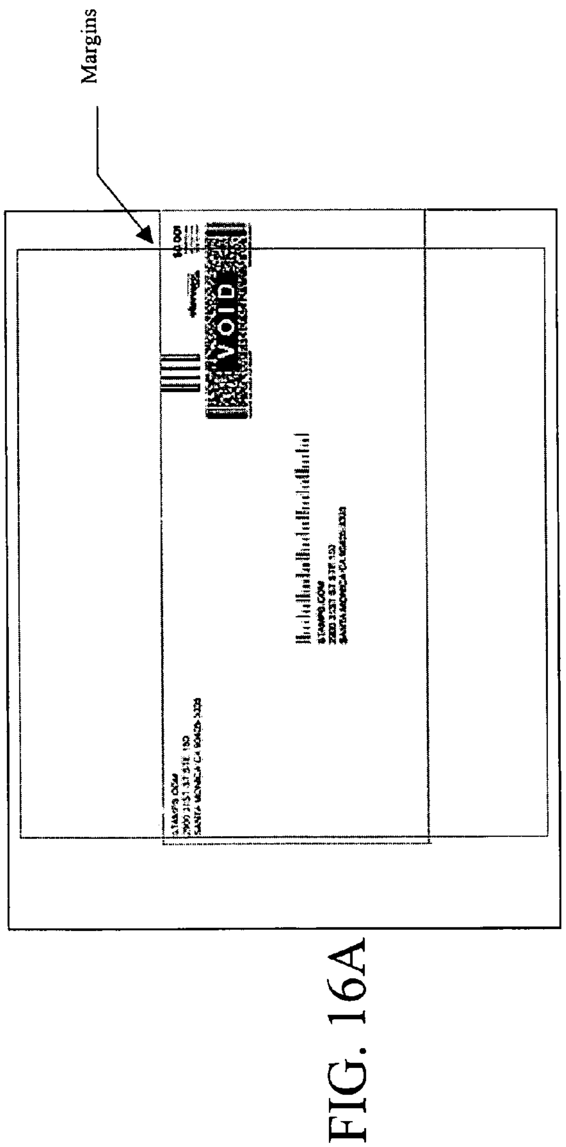
FIG. 16A is a plan view of an envelope image that does not pass the margin requirements test.
Figure 16B:
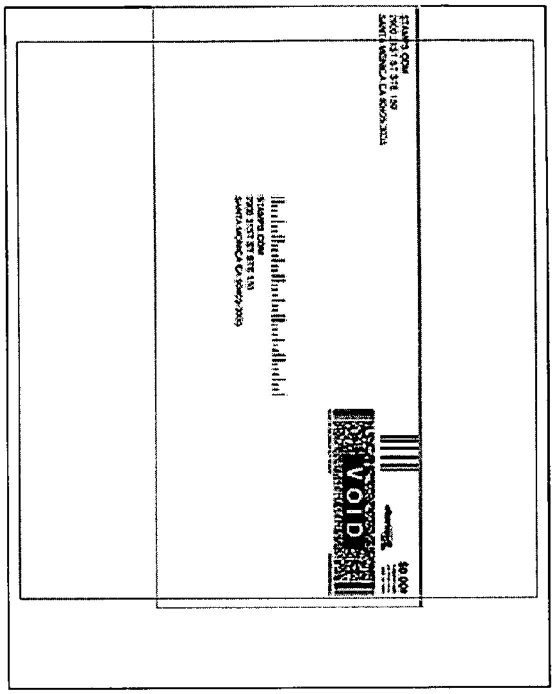
FIG. 16B is a plan view of the envelope image of FIG. 16A with the image rotated 180° to satisfy the margin requirements test in accordance with an exemplary embodiment of the present invention.

Referring to FIG. 16A, in operation the client software preferably checks the margin requirements (top margin less than or equal to 0.125" and right margin less than or equal to 0.70") to determine whether the image will properly print onto the envelope in accordance with USPS requirements. Referring to FIG. 16B, if the margins of the virtualized sheet do not satisfy the margin requirements the client software rotates the envelope image.

Referring back to FIG. 9 the client software tests the margin requirements again 86 after rotation. If the margins of the virtualized sheet, with the rotated image, fail to satisfy the margin requirements, the client software cannot print the envelope 89. If the margins of the virtualized sheet satisfy the margin requirements with rotation the client software renders the envelope image 87 and prints the envelope 81. Thus, the rotation process can help determine the ultimate orientation of the envelope image on the virtual sheet of paper.

To print postal indicia, the client software preferably uses a drawing surface to render an envelope image contained in a printable region of a virtualized sheet. The drawing surface may be used to calculate the location of each character to be printed. The drawing surface is preferably represented by a coordinate, system having a logical origin. Each point on the coordinate space is represented by a set of coordinates, X and Y, (x,y). The (x,y) coordinates determine the precise location of the object to be drawn. Microsoft Windows supports four different coordinate spaces.

The attributes of a particular coordinate system are defined by the mapping mode. Page-space coordinates set the mapping mode. The mapping mode defines the unit of measure used to translate the page-space coordinates into the device-space coordinates used by a printer, and also defines the orientation of the device's x and y axes. For example, in HiEnglish mapping mode, each unit in the page-space coordinates is mapped to 0.001" in device-space coordinates and the value of X increases to the right and Y increases up from the bottom.

To support printing to a particular printing device, the client software preferably maps or copies the page area from one coordinate space to another. The client software initially renders the objects on a coordinate space called page space (sometimes referred to as logical space) using a modified Hi English mapping mode and translates the objects to the device coordinate space.

Figure 17A:
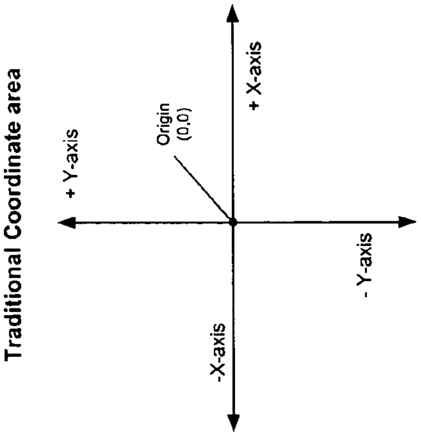
FIGS. 17A, 17B and 17C are coordinate axes used for rendering an envelope image with and without image rotation.

Referring to FIG. 17A, an exemplary embodiment of the present invention utilizes a standard x and y coordinate system. To standardize the coordinate area, an exemplary embodiment of the present invention preferably flips the x axis and y axis to support rotations that are necessary to print the image. The client software uses Windows mapping code that allows the axes to be flipped and creates a custom mapping code.

Figure 17B:
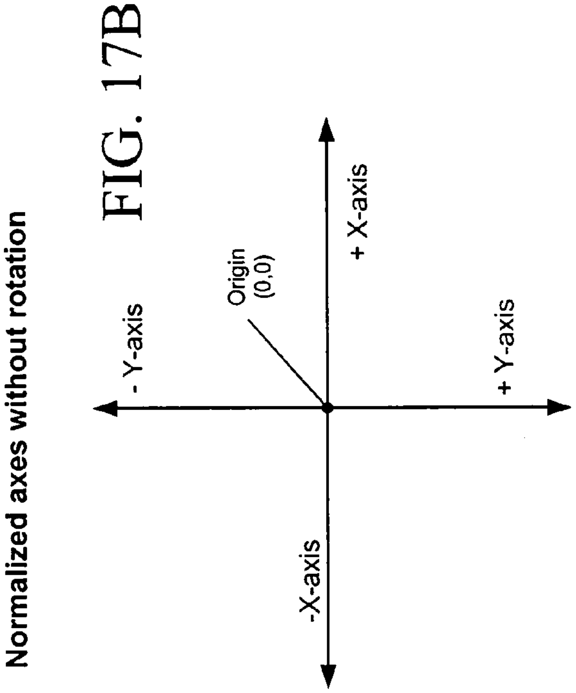
Figure 17C:
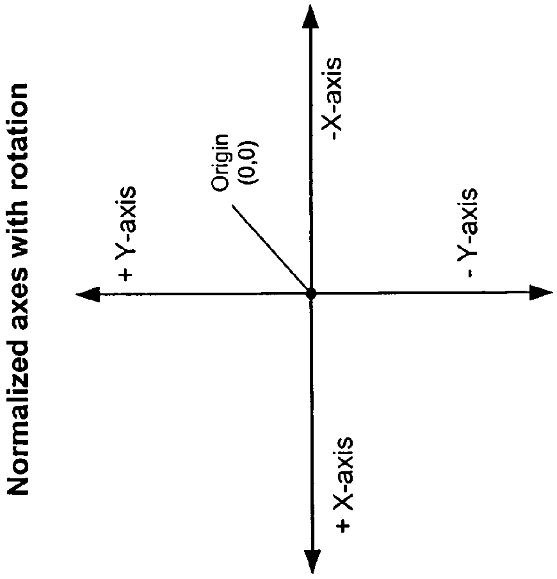

FIG. 17B shows the axes used by the client software for envelopes without rotation. The action of flipping forms a standard coordinate space with the positive x axis pointing to the right and the positive y axis pointing down. Similarly, FIG. 17C shows the custom axes used by the client software for envelopes with rotation.

Figure 18:
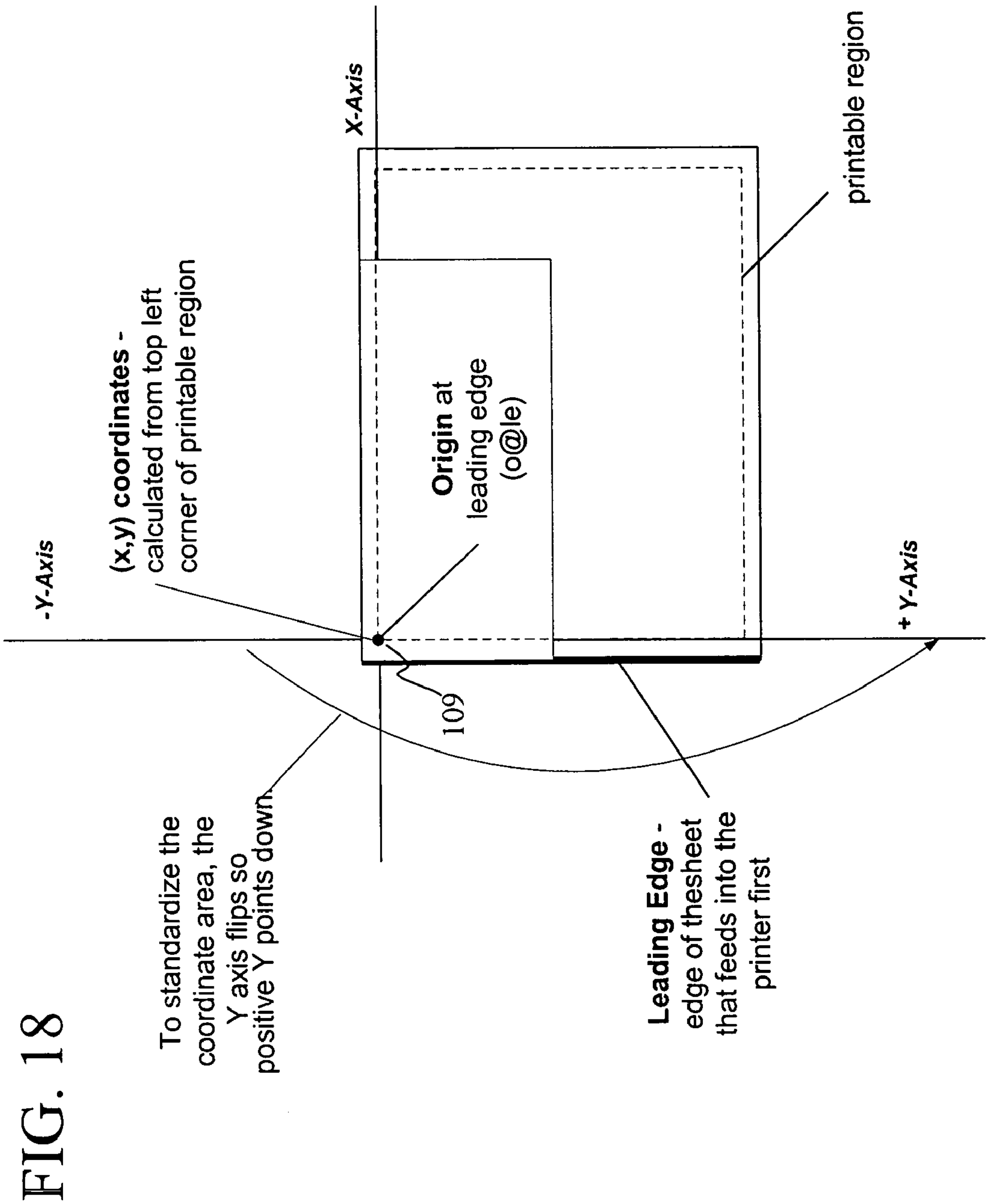
FIG. 18 is a plan view of a page layout including a standardized axis for an envelope image without rotation in accordance with an exemplary embodiment of the present invention.
Figure 19:
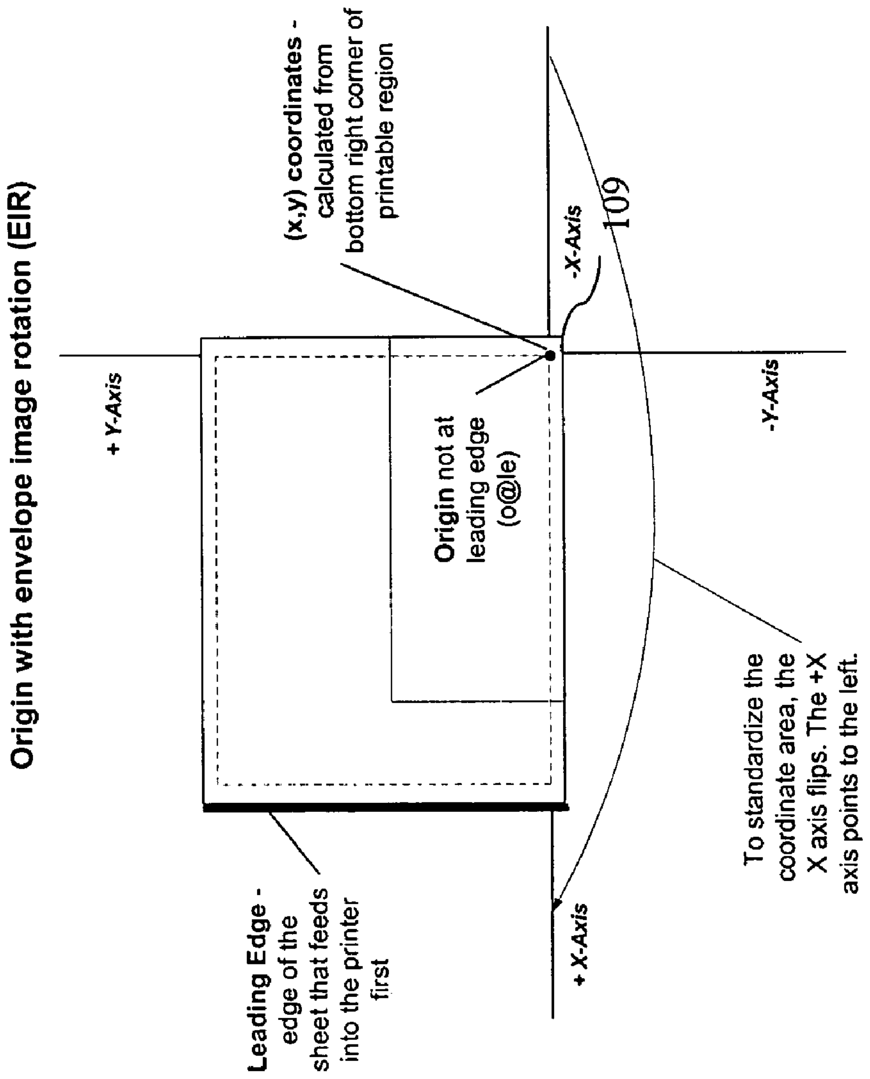
FIG. 19 is a plan view of a page layout including a standardized axis for an envelope image with rotation in accordance with an exemplary embodiment of the present invention.

Referring to FIG. 18, the origin 109 of the virtualized sheet is preferably located at the top left-hand corner of the printable region of the virtualized sheet (the envelope.) The x and y coordinates may then be calculated from the origin. For example, If the positive X axis points to the right and the value of X is five, an exemplary drawing routine translates to the right side of the origin five units. Alternatively, if the positive X axis points to the left side and the value of X is five, the system drawing routine translates to the left side of the origin five units. Referring to FIG. 19, when the envelope image is rotated, the client software flips the X-axis so the positive X-axis points to the left direction and the positive Y-axis points upward.

If the origin is not at the top-left corner of the envelope, the client software translates the origin of the virtual sheet to the top-left corner of the envelope. For top, center or bottom offset printers the origin of the virtualized sheet preferably translates in the positive X direction a distance equal to the value of the paper-width minus envelope-width. Similarly, for center offset printers the origin preferably shifts in the positive y direction a distance equal to the value of (the paper-height minus envelope-height) divided by two. For bottom offset printers the origin preferably shifts in the positive y direction a distance equal to the value of the paper-height minus envelope-height.

In addition, the server based printer database may contain shift overrides. An exemplary embodiment of the present system preferably queries the server based printer database to determine if shift overrides exist and if so applies those overrides. An exemplary system further determines whether the image should be rotated. If so the software preferably translates the origin diagonally across the envelope image. To shift the image, the x axis translates in the positive X direction a distance equal to the value of the (envelope-width minus the left margin width) minus the width of the right margin. In addition, the y axis translates in the positive y direction a distance equal to envelope height minus the height of the top margin. The rendering process translates the logical coordinates of the image to device coordinates of the printer to correctly locate and print the indicia on the mailpiece.

Figures 20A, 20B, 20C, 20D:
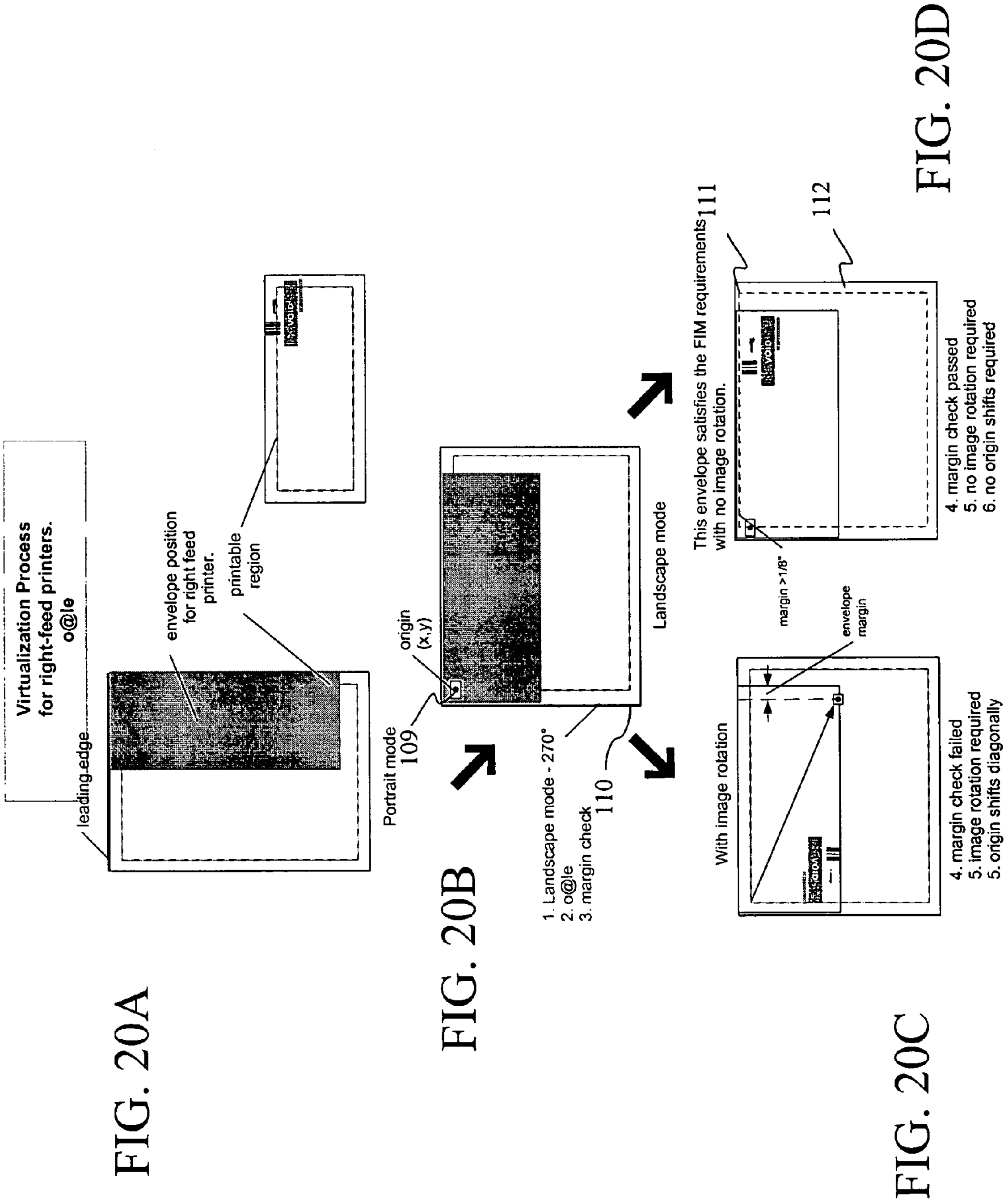
FIGS. 20A–20G demonstrate image rendering for a right feed printer in accordance with an exemplary embodiment of the present invention.

The operation of an exemplary image printing process may be best demonstrated with a series of examples. FIG. 20A shows a right hand feed printer with a printable location in the portrait mode. As shown in FIG. 20B when the printer rotates 270° into landscape mode the origin 109 of the virtualized sheet is at the leading edge 110 of the virtualized sheet. An exemplary embodiment of the present invention performs a margin requirements test to determine if the printer top margin 111 (relative to the origin of the virtual sheet) is less than 0.125" (to support FIM printing to USPS requirements) and the right margin 112 is less than 0.70" (to allow a logo of the postal service provider to be included in the indicium). If the image satisfies the margin requirements the postal indicia prints correctly onto the envelope as shown in FIG. 18D.

However, referring to FIG. 20C, if the image does not meet the margin requirements, the client software rotates the image 180°, and tests the margins again. To perform the margin requirements test with a rotated the image, the client software substitutes the bottom margin for the top margin and the left margin for the right margin. Thus the bottom margin should now be less than 0.125" and the left margin should now be less than 0.70". If the rotated image satisfies the margin requirements the client software may use rendering algorithms to relocate the origin and print the image correctly.

Figure 20E:
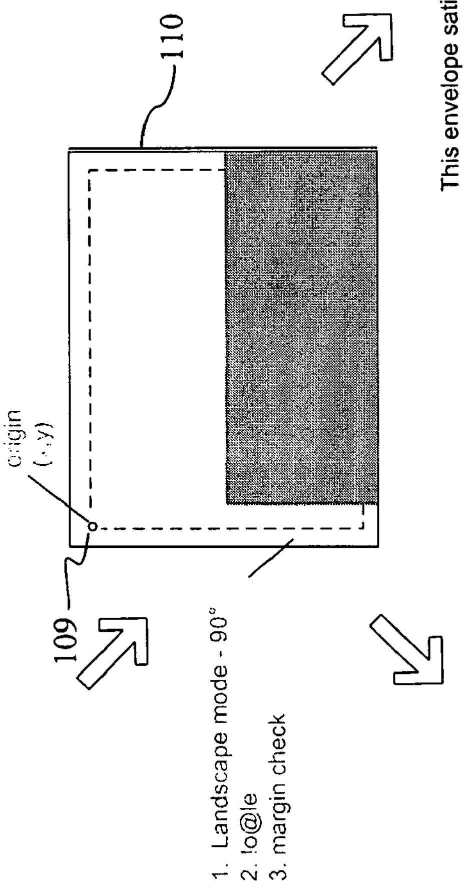

Referring to FIG. 20E when a right hand feed printer rotates 90° into landscape mode the origin 109 of the virtualized sheet is not located at the leading edge 110 of the virtualized sheet. An exemplary embodiment of the present invention performs a margin requirements test to determine if the envelope image satisfies the predetermined margin requirements, (i.e. printer top margin is less than 0.125" and the right margin is less than 0.70"). If the image passes the margin requirements test the postal indicia prints correctly onto the envelope as shown in FIG. 20G.

Figure 20F:
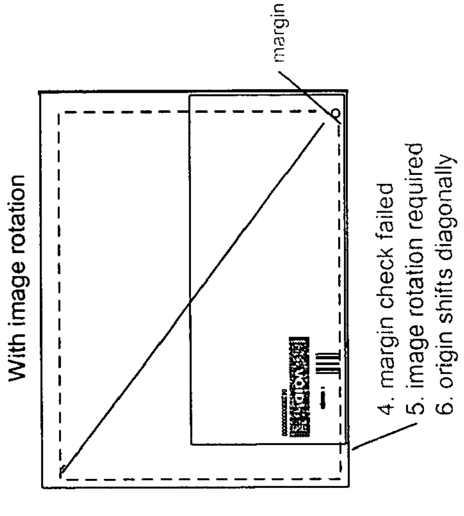
Figure 20G:
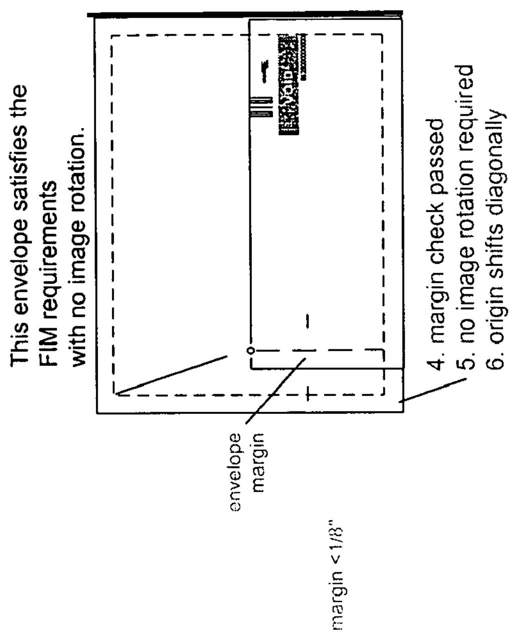

However, referring to FIG. 20F, if the envelope does not meet the margin requirements test, the postal indicia, including FIM barcode may be located outside the printable region of the virtualized sheet and the envelope may fail the USPS requirements for FIM barcode placement. The client software therefore, rotates the image 180°, and performs the margin requirements test again. If the image satisfies the margin requirements the client software uses rendering algorithms to print the postal indicia onto the envelope. In this instance the origin is preferably shifted across and down the page so that the image may be correctly printed.

Figures 21A, 21B, 21C, 21D:
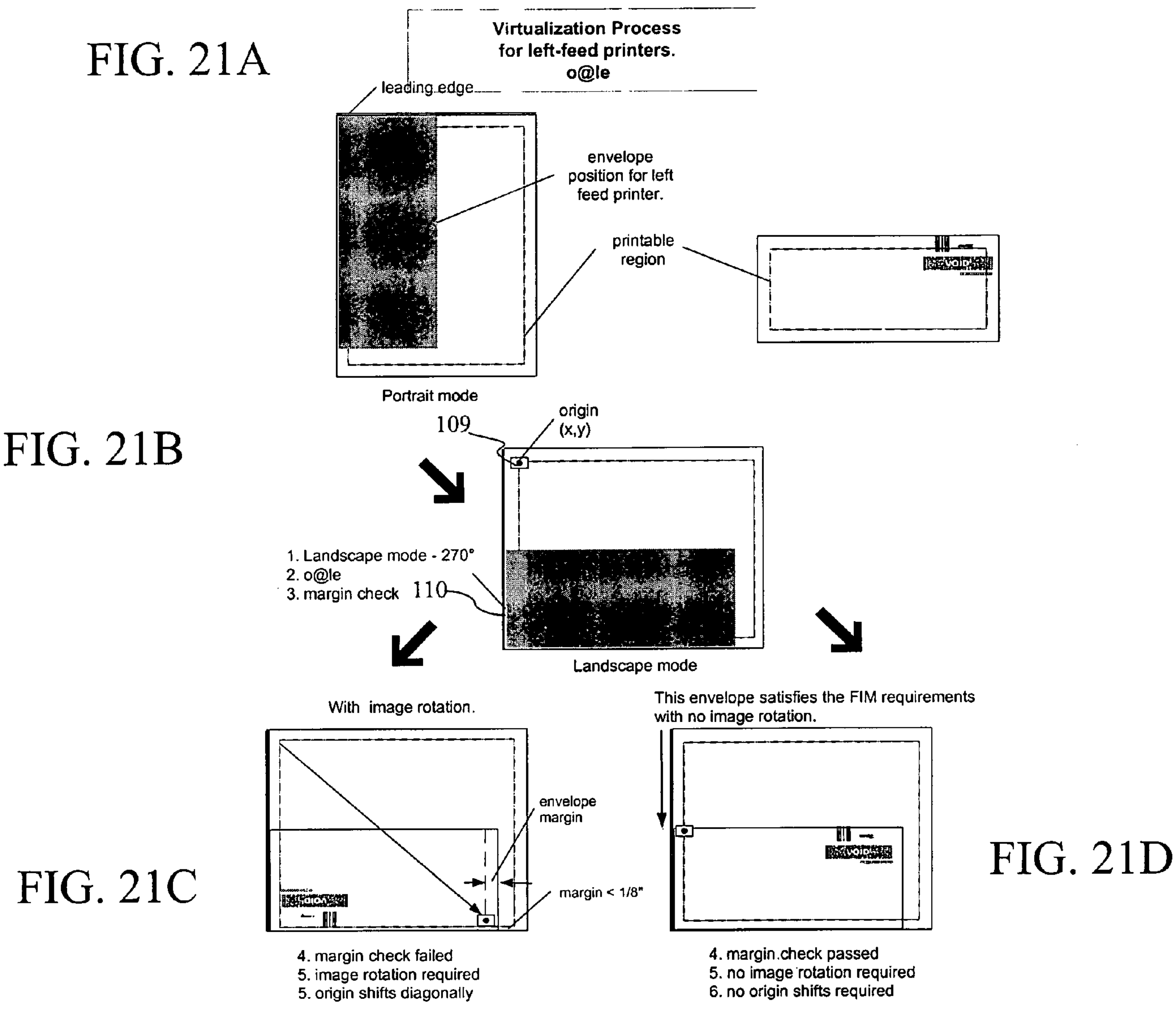
FIGS. 21A–21G demonstrate image rendering for a left feed printer in accordance with an exemplary embodiment of the present invention.

Similarly, FIG. 21A shows a left hand feed printer with a printable location in the portrait mode. As shown in FIG. 21B when the printer rotates 270° into landscape mode the origin 109 of the virtualized sheet is located at the leading edge 110 of the virtualized sheet. An exemplary embodiment of the present invention performs a margin requirements test to determine if the envelope image satisfies the predetermined margin requirements, (i.e. printer top margin is less than 0.125" and the right margin is less than 0.70"). If the image satisfies the margin requirements the postal indicia prints correctly onto the envelope without image rotation as shown in FIG. 21D. The client software may therefore use rendering algorithms to relocate the origin and print the envelope.

However, referring to FIG. 21C, if the image does not meet the margin requirements, the client software rotates the image 180°, and performs the margin requirements test again. If the image satisfies the margin requirements, the client software may use rendering algorithms to relocate the origin and print the image correctly.

Figure 21E:
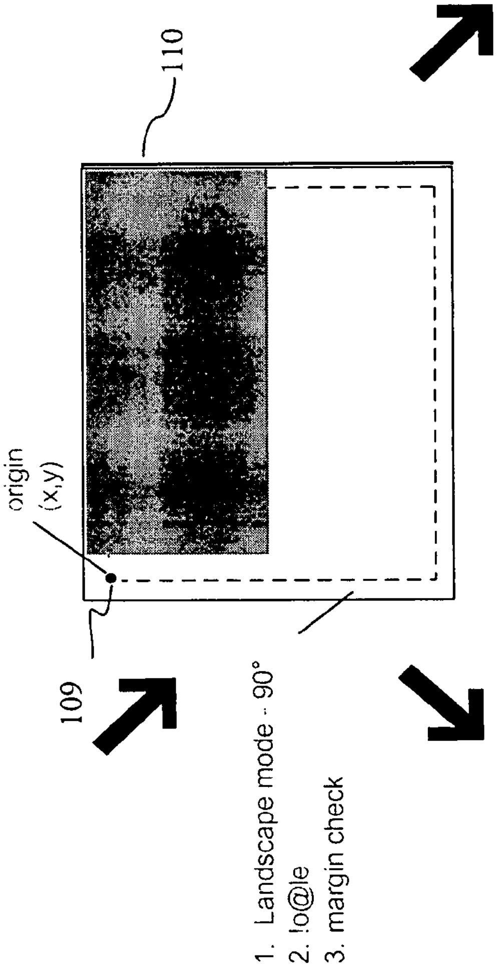

Referring to FIG. 21E when a left hand feed printer rotates 90° into landscape mode the origin 109 of the virtualized sheet is not located at the leading edge 110 of the virtualized sheet. An exemplary embodiment of the present invention performs a margin requirements test to determine if the envelope image satisfies the predetermined margin requirements, (i.e. printer top margin is less than 0.125" and the right margin is less than 0.70"). If the image passes the margin requirements test the postal indicia prints correctly onto the envelope without rotation as shown in FIG. 21G. The client software uses rendering algorithms to shift the origin and print the postal indicia onto the envelope.

Figure 21F:
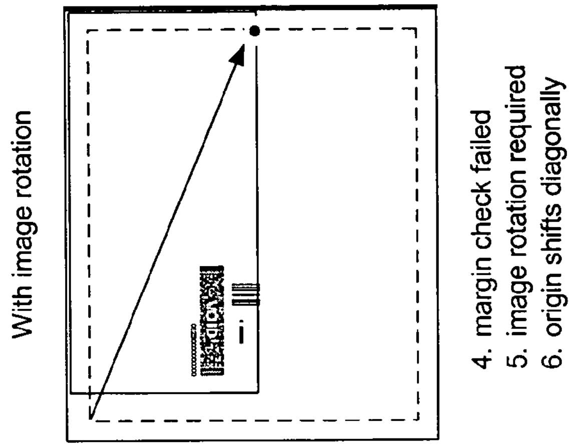
Figure 21G:
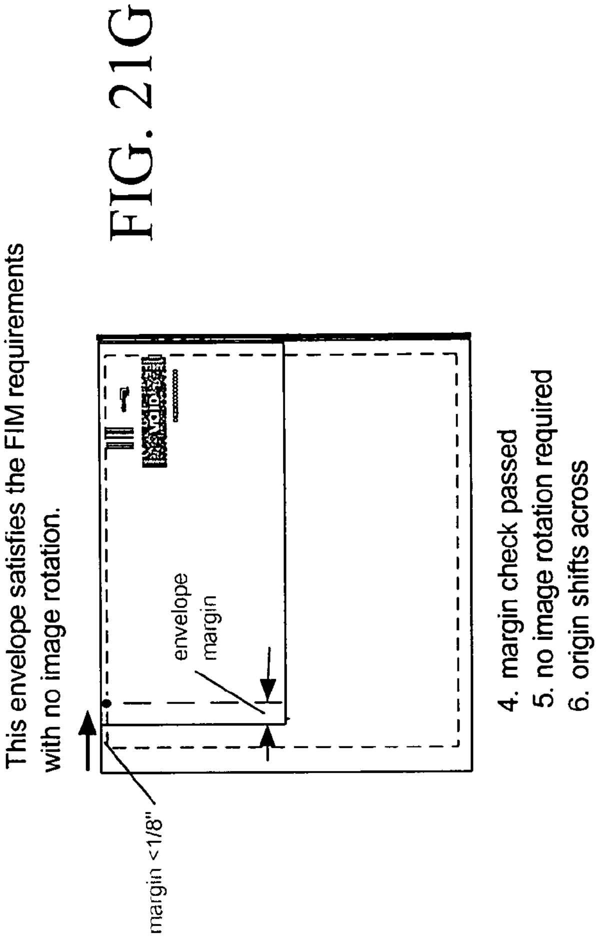

However, referring to FIG. 21F, if the envelope image does not meet the margin requirements, the postal indicia, including FIM barcode may be located outside the printable region of the virtualized sheet and the envelope may fail the USPS requirements for FIM barcode placement. The client software therefore, rotates the image 180°, and performs the margin requirements test again. If the image satisfies the margin requirements the client software uses rendering algorithms to print the postal indicia onto the envelope. In this instance the origin is preferably shifted across and down the page so that the image may be correctly printed.

Figures 22A, 22B, 22C, 22D:
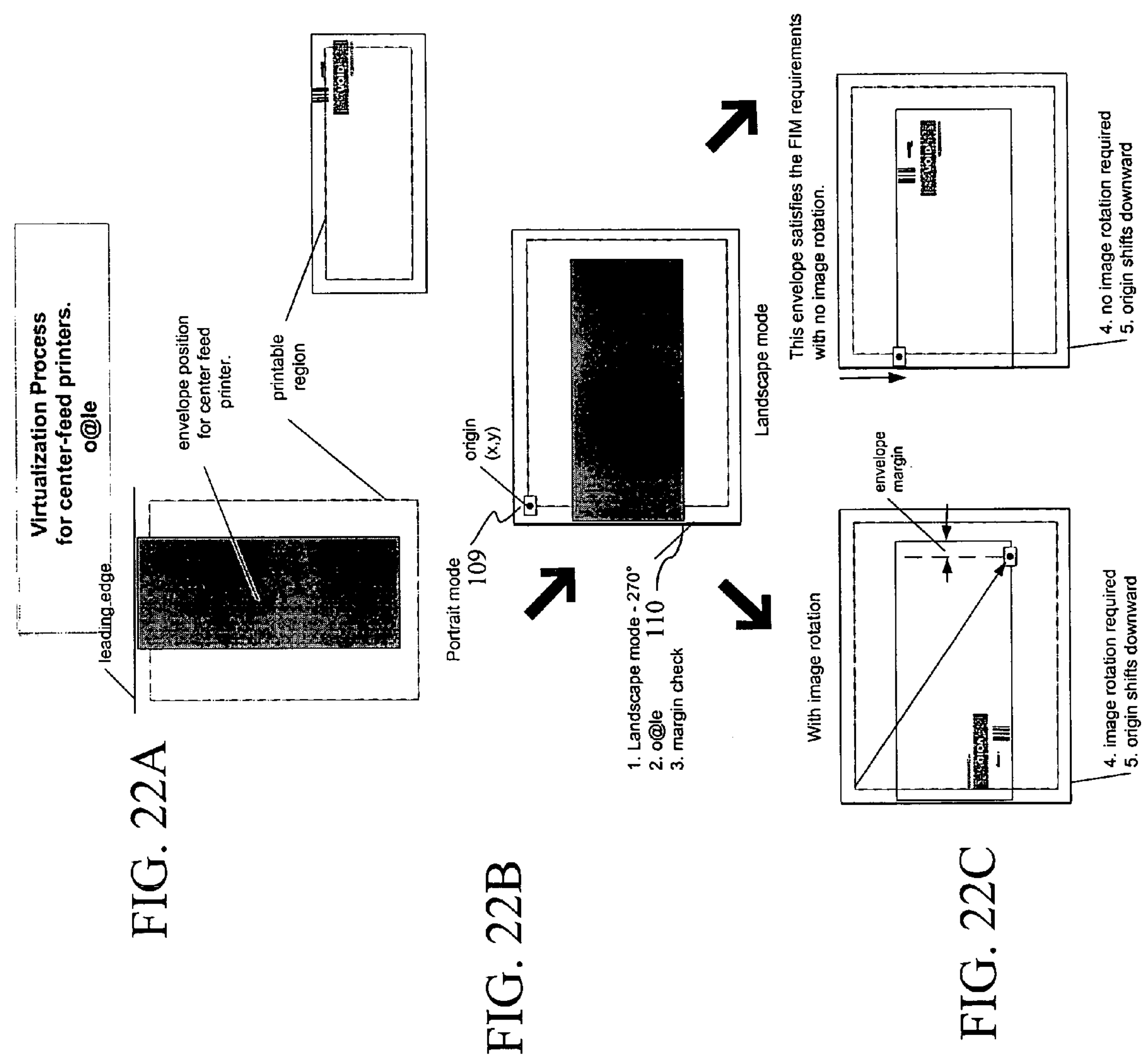
FIGS. 22A–22G demonstrate image rendering for a center feed printer in accordance with an exemplary embodiment of the present invention.

As a further example, FIG. 22A shows a center feed printer with a printable location in the portrait mode. Referring to FIG. 22B, when the printer rotates 270° into landscape mode the origin 109 of the virtualized sheet is at the leading edge 110 of the virtualized sheet. An exemplary embodiment of the present invention performs a margin requirements test to determine if the envelope image satisfies the predetermined margin requirements, (i.e. printer top margin is less than 0.125" and the right margin is less than 0.70"). If the image passes the margin requirements test the postal indicia prints correctly onto the envelope without image rotation as shown in FIG. 22D. The client software may therefore use rendering algorithms to relocate the origin and print the envelope.

However, referring to FIG. 22C, if the image does not meet the margin requirements, the client software rotates the image 180°, and performs the margin requirements test again. If the image satisfies the margin requirements, the client software may use rendering algorithms to relocate the origin and print the image correctly.

Figure 22E:
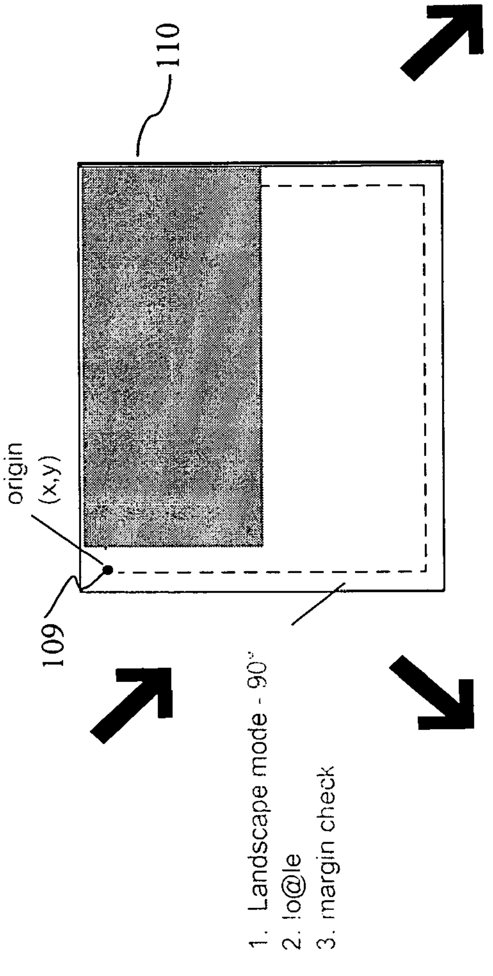

Referring to FIG. 22E when a center fed printer rotates 90° into landscape mode the origin 109 of the virtualized sheet is not located at the leading edge 110 of the virtualized sheet. An exemplary embodiment of the present invention performs a margin requirements test to determine if the envelope image satisfies the predetermined margin requirements, (i.e. printer top margin is less than 0.125" and the right margin is less than 0.70"). If the image passes the margin requirements test the postal indicia prints correctly onto the envelope without rotation as shown in FIG. 22G. The client software uses rendering algorithms to shift the origin down and across and print the postal indicia onto the envelope.

Figure 22F:
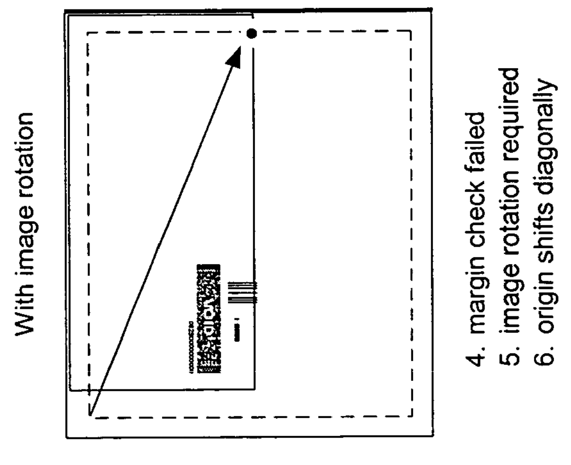
Figure 22G:
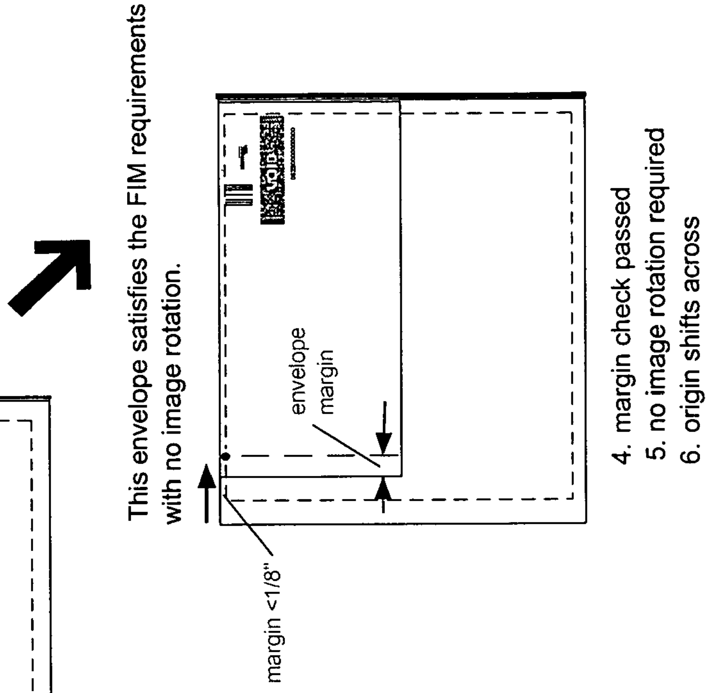

However, referring to FIG. 22F, if the envelope does not meet the margin requirements, the postal indicia, including FIM barcode may be located outside the printable region of the virtualized sheet and the envelope may fail the USPS requirements for FIM barcode placement. The client software therefore, rotates the image 180°, and performs the margin requirements test again. If the image satisfies the margin requirements the client software uses rendering algorithms to print the postal indicia onto the envelope. In this instance the origin is preferably shifted across and down the page so that the image may be correctly printed. Thus, the rotation process can help determine the ultimate orientation of the envelope image on the virtual sheet of paper.

Figure 23:
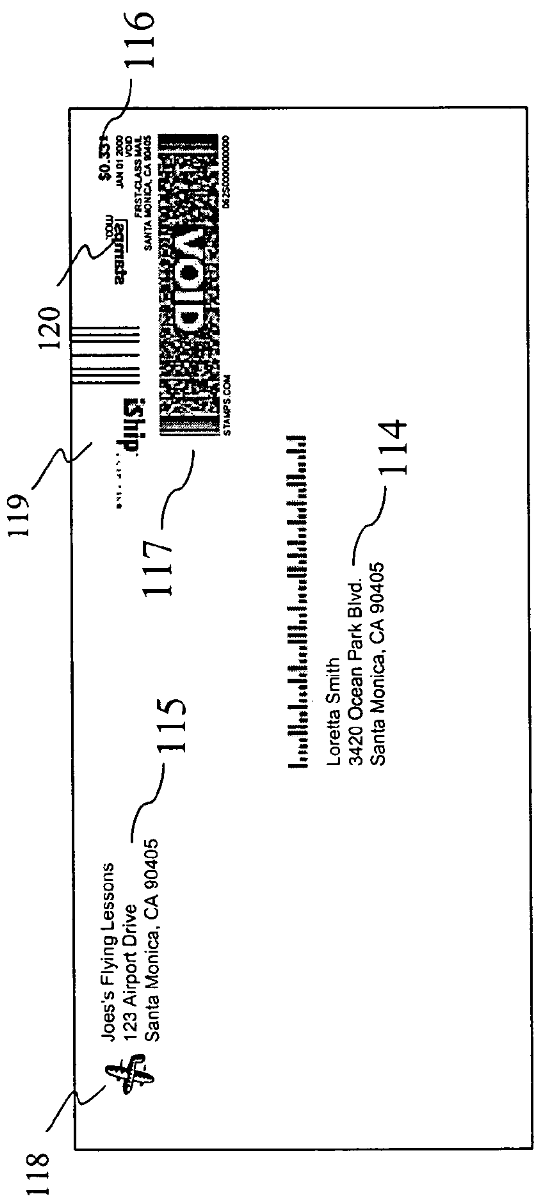
FIG. 23 is a plan view of an envelope illustrating inverted graphic components of the postal indicia as result of rotating the envelope image.

In the described exemplary embodiment the client software flips the X-axis so the positive X-axis points to the left when the envelope image is rotated. Certain printers may not be able to support flipping the X-axis. As a result, these printers may print the postal indicia with the graphic portion inverted or without the graphic altogether (see FIG. 23). Therefore, an exemplary embodiment of the client software preferably includes a two pass graphic rendering routine that allows the client software to separately render the textual and graphic components of the mailpiece.

Figure 24:
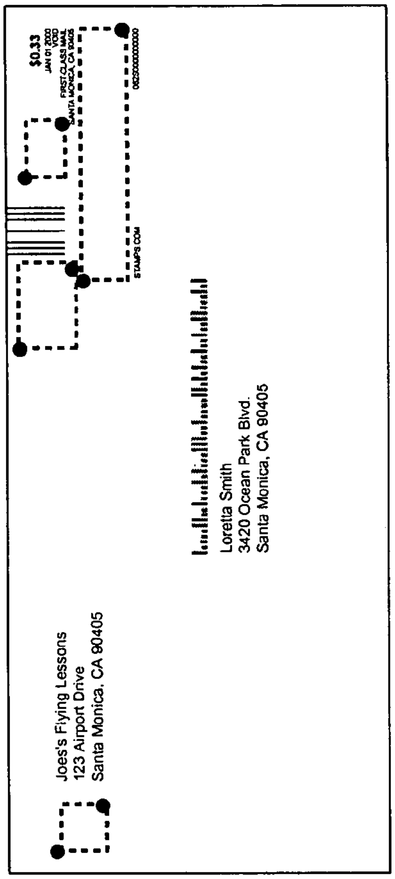
FIG. 24 is a plan view of an envelope with text components and internal data representation of coordinates for an image of the graphic components of the postal indicia in accordance with an exemplary embodiment of the present invention.

In operation, the client software performs a first set of adjustments to the drawing surface and renders the textual components, including the delivery address 114, the return address 115 and the indicium 116 of the mailpiece. The client software preferably stores the image information for the graphic components as well as the corner coordinate points of the location where the image of the graphic components are to be printed (see FIG. 24).

The graphic components include the 2-d Bar code 117, the return address graphic 118, the indicium graphic 119 and the service provider logo 120. Once the textual information is rendered, the client software preferably adjusts the drawing surface a second time. In the described exemplary embodiment, the client software resets the mapping mode to MM_TEXT, each logical pixel maps to a physical device pixel, the positive X axis points to the right, and the positive Y axis points downward. The client software traverses the list of saved images of the graphic components, rendering them for printing using the new coordinates.

However, the axes have been flipped in the opposite direction from the standard rotated mode. Therefore, the client software preferably rotates the images of the graphic components 180°. In an exemplary embodiment of the client software, the images of the graphic components are rotated in memory using standard image processing techniques. Upon completion of printing the client software refreshes the drawing surface to its original state before any adjustments were made.

An exemplary embodiment of the present invention includes various print setup wizards, such as for example, print verification, print QA envelope and determine top, center or bottom envelope feed. The print setup wizards are preferably stored in a printer setup portion of a getting started wizard that a user may execute before utilizing the software.

Figure 25:
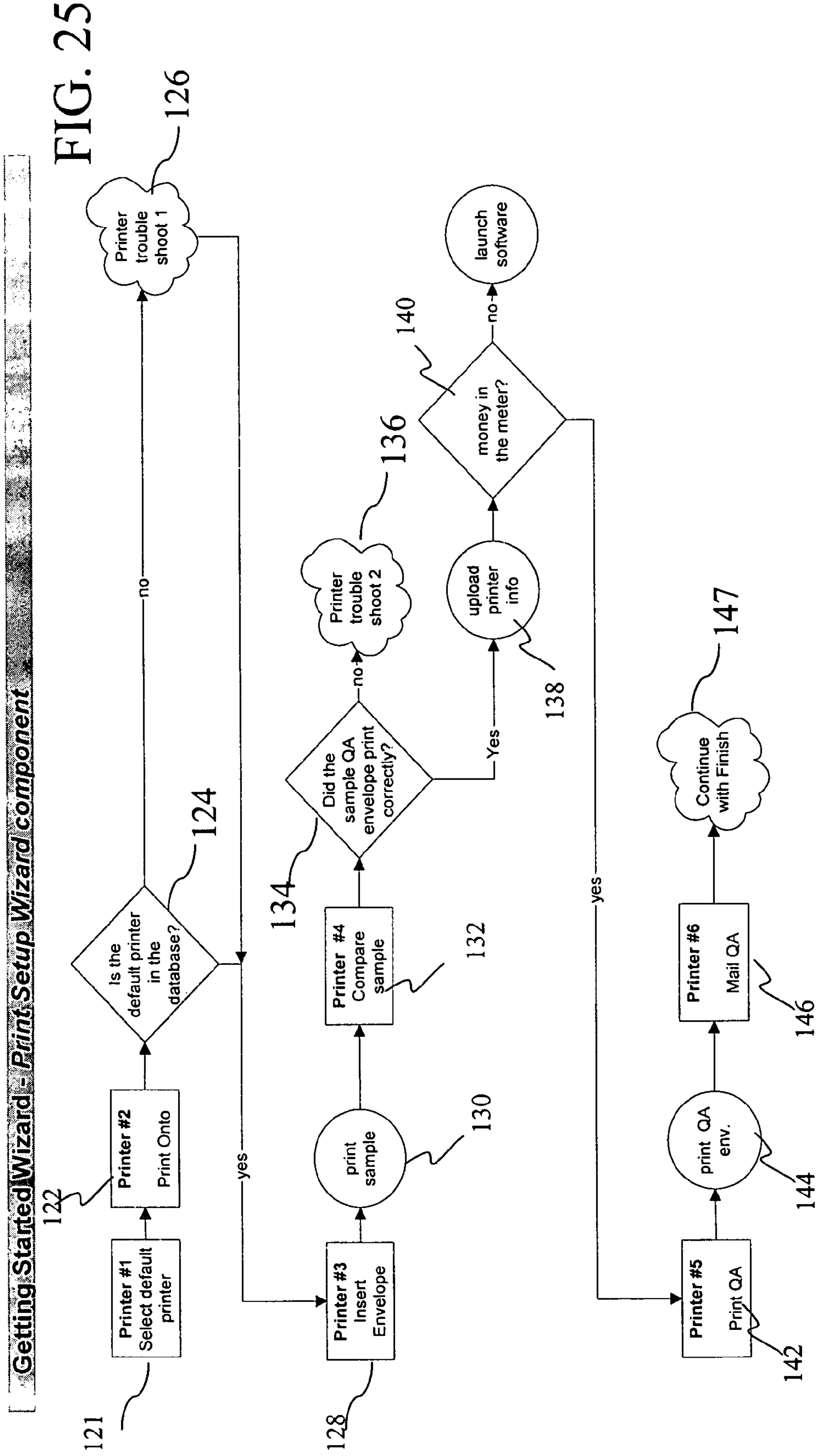
FIG. 25 is a logic flow diagram of a getting started printer setup wizard in accordance with an exemplary embodiment of the present invention.

An exemplary logical flow diagram of the printer setup component is shown in FIG. 25. An initial default printer selection screen 121 allows the user to select a default printer. A print onto screen 122 then prompts the user to select an envelope size to be used for printer setup testing. Next the system may determine 124 whether the default printer selected by the user is stored in the server based printer database. If the default printer is not included in the database the system defaults to a printer trouble shoot wizard 126 to determine the feed offset for the selected default printer.

If the default printer is included in the database an insert envelope screen 128 preferably prompts the user to insert an envelope into the printer to complete further setup testing. The system then prints a test sample 130 onto the envelope inserted into the printer. A compare sample screen 132 preferably then prompts the user to compare 134 the printed postage sample with a representative envelope displayed on the screen. If the postage sample printed on the envelope does not match the postage on the displayed envelope the system may again default to a printer trouble shoot wizard 136 to determine the feed offset for the selected default printer. If the printed sample matches the displayed postage the system may upload 138 print parameters for the selected default printer into the server based print database.

The USPS requires users of computer-based postage processing systems to mail in an actual postage sample printed on what is known as a quality assurance (QA) envelope. The USPS utilizes the QA envelope to confirm that the printed postage complies with the promulgated USPS standards. Since the QA envelope must include valid postage the system preferably determines whether the user's account balance 140 is sufficient to cover the postage. If the account balance is sufficient a print QA envelope screen 142 may inform the user as to the requirements for a QA envelope and prompts the user to insert an envelope into the printer. The system may then print 144 a valid postal indicum onto the inserted envelope. A mail QA envelope screen 146 may then prompt the user to forward the QA envelope to the USPS. A finish screen 147 may then inform the user that the set-up wizard has been successfully completed.

Figure 26:
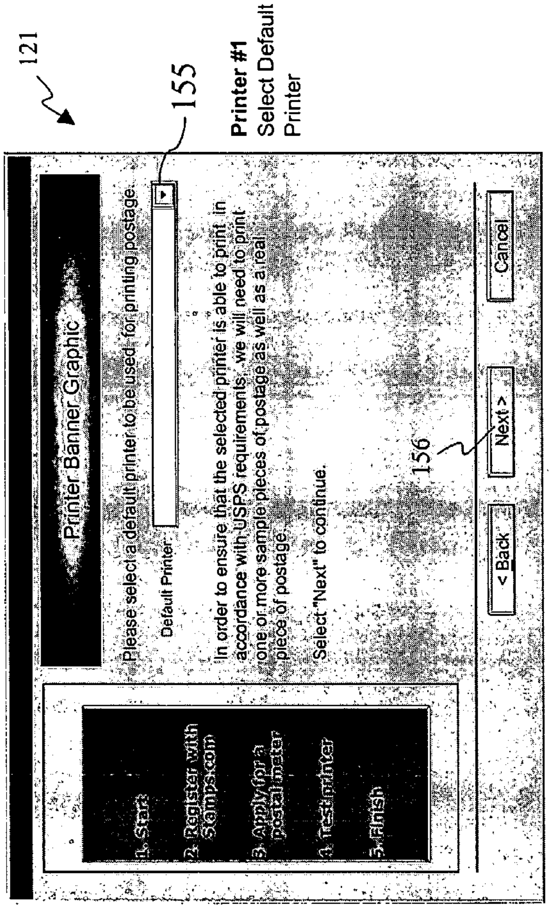
FIG. 26 is a capture of an exemplary select default printer screen in accordance with an exemplary embodiment of the present invention.

FIG. 26 shows an exemplary select default printer screen 121. The select default printer screen 121 may inform the user that sample patterns need to be printed to verify compliance with USPS requirements. A drop down box 155 may display the printers that are installed on the user's system, and allow the user to select a default printer. The default printer selection is preferably incorporated into the standard print prepare dialog box, and therefore remains the default printer until the user selects otherwise. In the described exemplary embodiment, a "Next>" button 156 is not available until the user selects a default printer.

Figure 27:
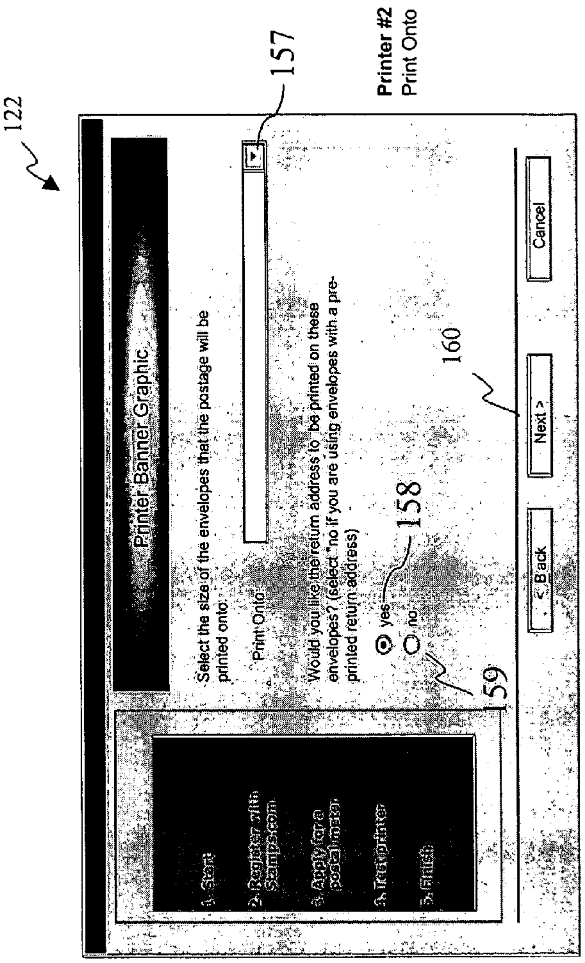
FIG. 27 is a capture of an exemplary print onto screen for selecting envelope size and other print options in accordance with an exemplary embodiment of the present invention.

Referring to FIG. 27, an exemplary print onto screen 122 may allow the user to select information needed to support the print test functions. For example, a drop down box 157, may be used to allow users to select the size of the envelope to be used throughout the tests. The user may also be allowed to omit the return address. For example, the user may be allowed to select a "yes" button 158 with the mouse to print the return address or a "no," button 159 to prevent the return address from printing.

The user's selections may be stored and used for all testing undertaken within the print setup wizard. The information that is gathered here may also be used to populate the corresponding fields within the print postage and print options dialog boxes when the user first launches these screens. In an exemplary embodiment of the present invention, a "Next>" button 160 is not available until the user selects an envelope size and answers the yes/no question.

Figure 28:
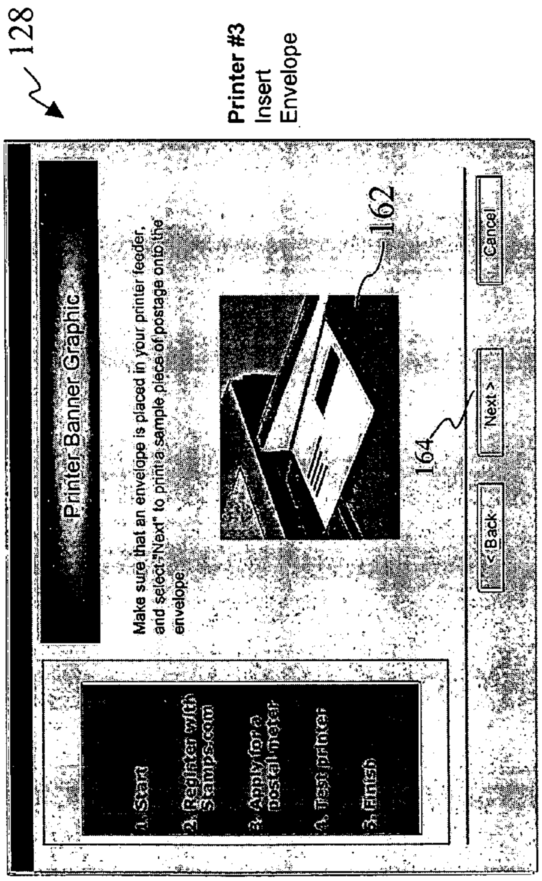
FIG. 28 is a capture of an exemplary insert envelope screen that request a user to insert an envelope into the printer feeder so that a sample postage pattern may be printed print onto the envelope in accordance with an exemplary embodiment of the present invention.

Referring to FIG. 28, an exemplary insert envelope screen 128 notifies the user that postage is about to be printed, and instructs the user to load an envelope into the feeder. A graphic 162 of an envelope being placed into a printer is preferably used to help re-enforce the action to the user. This screen may be used multiple times during the printer setup portion of the getting started wizard. A "Next>" button 164 may be immediately available. When the "Next>" button is selected, a sample Quality Assurance (QA) envelope is preferably printed.

Figure 29:
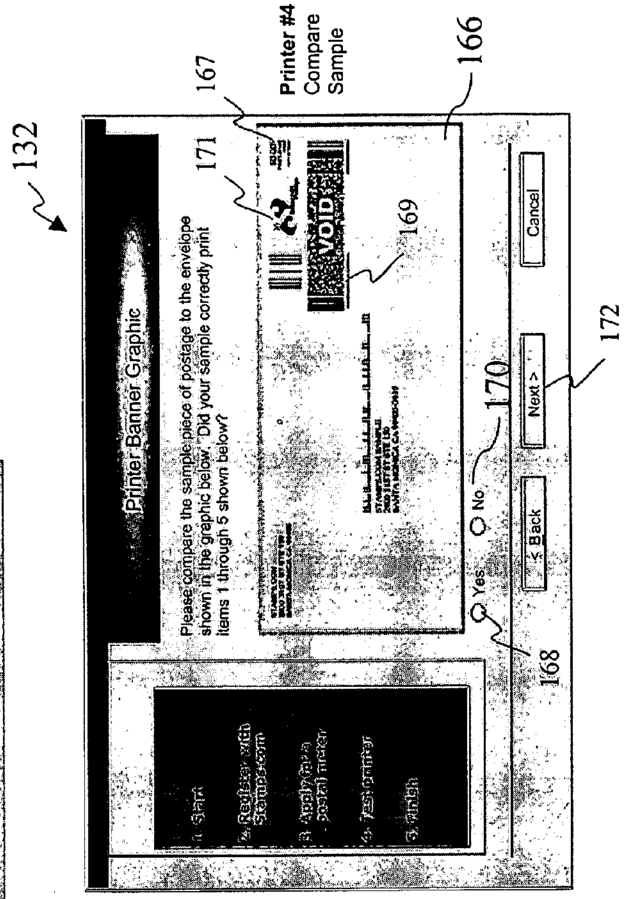
FIG. 29 is a capture of a compare sample screen wherein a user is requested to compare the sample envelope printed on the envelope to a postage displayed on an envelope on the screen in accordance with an exemplary embodiment of the present invention.

Referring to FIG. 29, an exemplary compare sample screen 132 prompts the user to compare the QA envelope with the envelope 166 displayed on the screen. The QA envelope preferably contains, FIM barcode, a human readable portion 167 and a two dimensional barcode portion 169. The human readable portion 167 may contain the postage value, mail class, the date and the meter number. In addition, a logo 171 and the destination zip code may be included. The two dimensional barcode 169 is intended to help thwart fraud, and may include information about the mail piece, such as for example, the destination ZIP code, the amount of postage applied, the date and time the postage was applied, and a digital signature so that the USPS can validate the authenticity of the postage. The user preferably verifies that each of the postal indicia features printed on the QA envelope match those displayed on the compare sample screen 132. In an exemplary embodiment of the present invention, neither a “yes” radio button 168 or a “no” radio button 170 is selected by default. A “Next>” button 172 is preferably not available until the user selects either the yes or no button.

Figure 30:
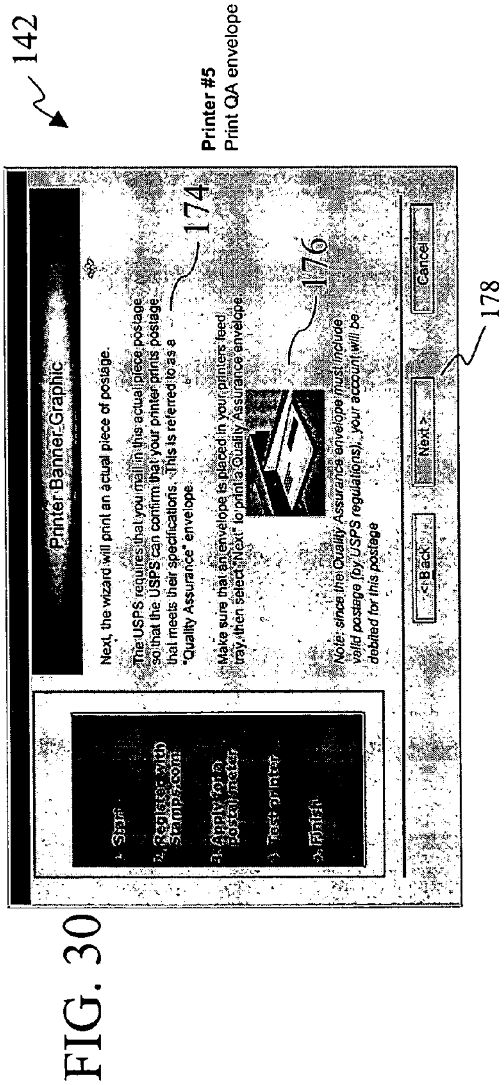
FIG. 30 is a capture of a print quality assurance (QA) screen wherein a user is requested to insert an envelope into the printer feeder so that a QA envelope may be printed in accordance with an exemplary embodiment of the present invention.

Referring to FIG. 30, an exemplary print QA screen 142 is similar to the insert envelope screen. The print QA screen 142 may educate 174 the user about the purpose of and requirements for QA envelopes. In addition the print QA screen 142 may instruct the user to load an envelope into the feeder because postage is about to be printed. A graphic 176 of an envelope being placed into a printer may be used to help re-enforce the action to the user. Further, the user may also be informed that the USPS requires QA envelopes to include valid postage and that the user's account will be debited for this postage. A “Next>” button 178 may be immediately available. When the “Next>” button 178 is selected, a QA envelope is printed.

Figure 31:
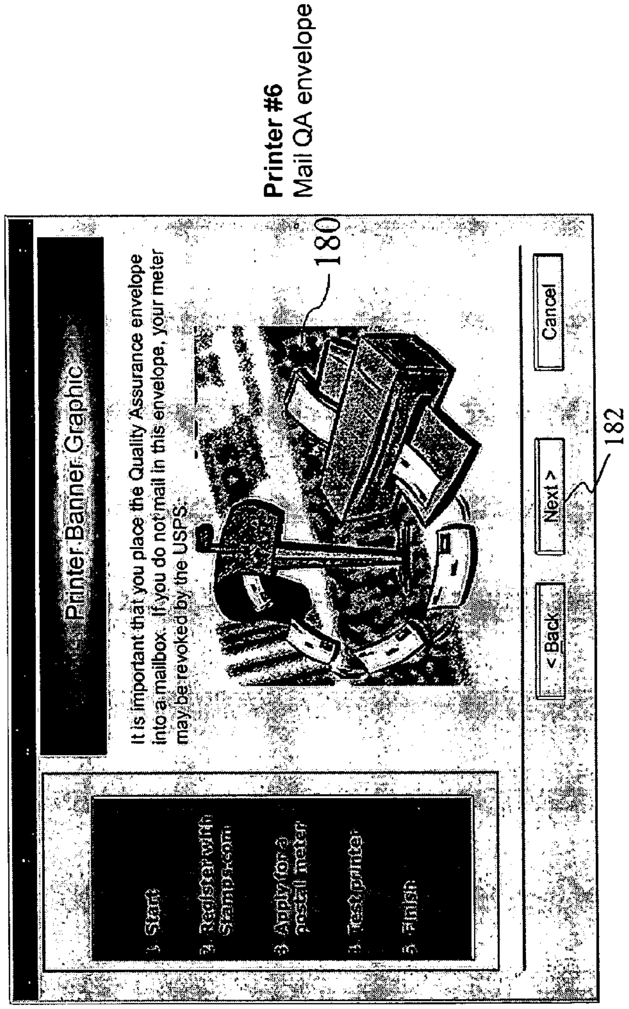
FIG. 31 is a capture of a mail QA envelope screen reminding the user to mail the QA envelope to the USPS in accordance with an exemplary embodiment of the present invention.

Referring to FIG. 31, an exemplary mail QA envelope screen 146 preferably instructs the user to promptly mail the QA envelope or the user's meter license may be revoked. A graphic 180 of an envelope being placed into a mail box may be used to help re-enforce the action to the user. A “Next>” button 182 may be immediately available.

Figure 32:
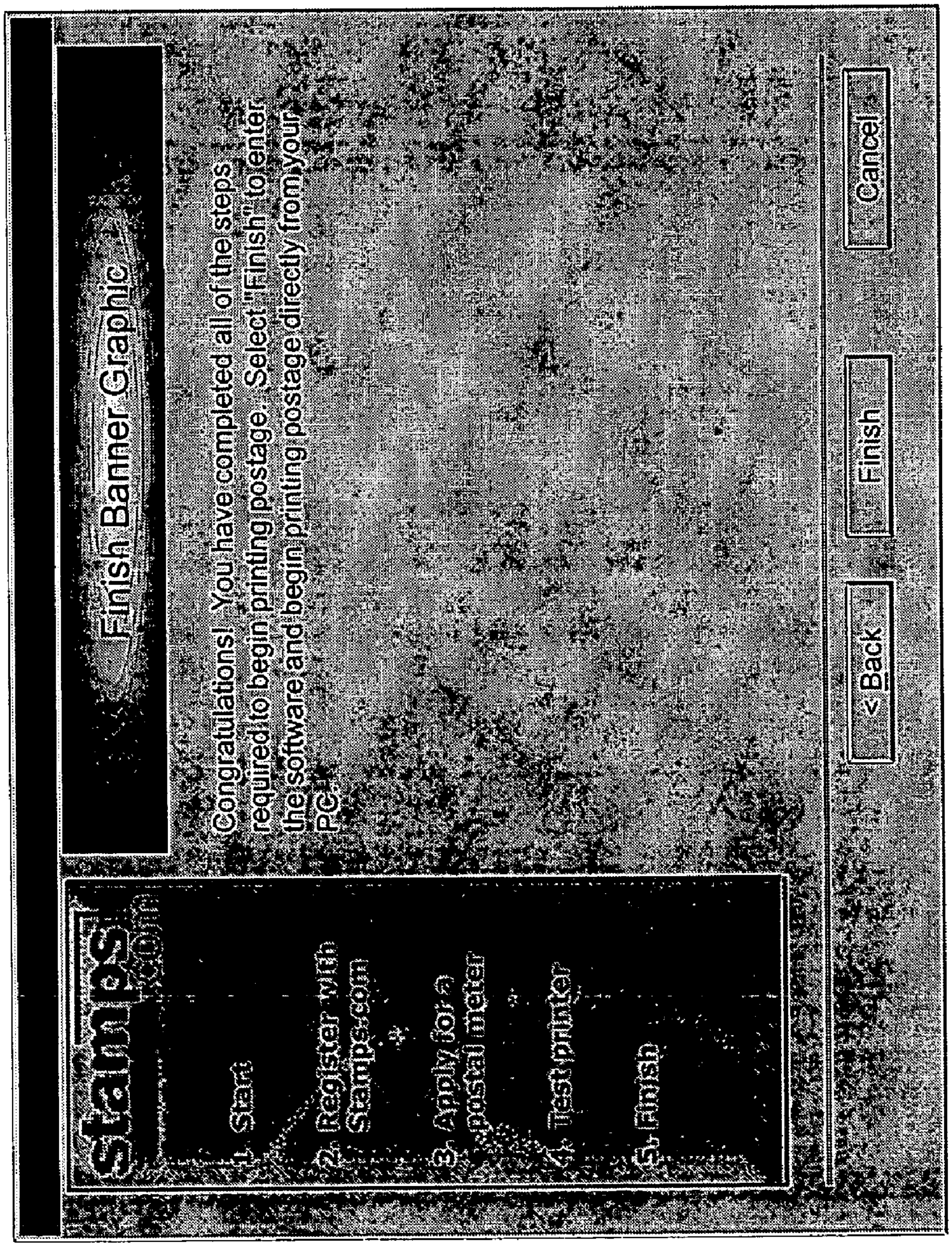
FIG. 32 is a capture of a finish screen informing the user that the set-up program has been successfully completed in accordance with an exemplary embodiment of the present invention.

Referring to FIG. 32 an exemplary finish screen 147 may be used to congratulate the user for completing the set-up wizard, and to launch online postal service software. A “Finish” button may be available immediately. Once the “Finish” button has been selected, the client software is preferably launched.

Figure 33:
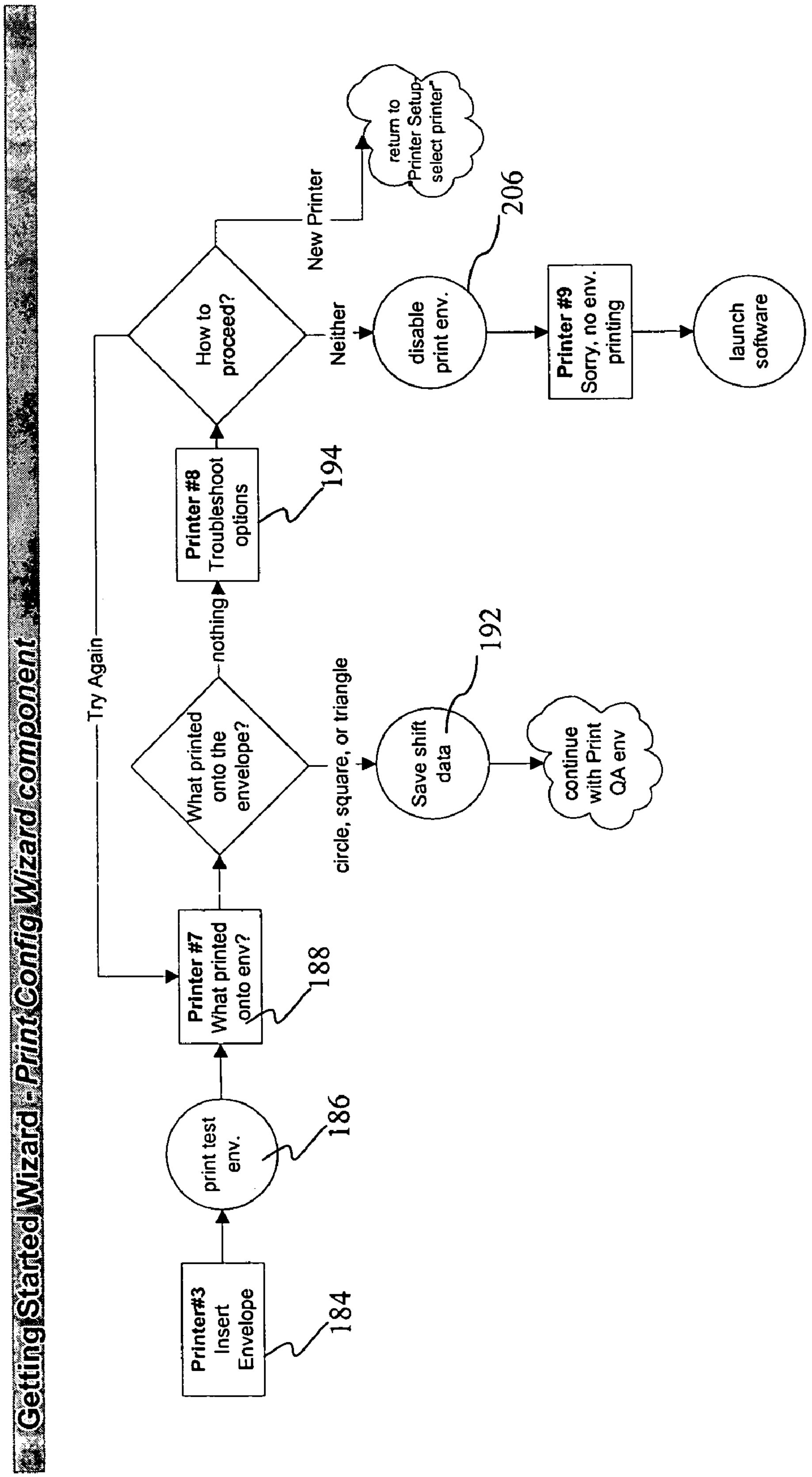
FIG. 33 is a logic flow diagram of a print configuration wizard in accordance with an exemplary embodiment of the present invention.
Figure 34:
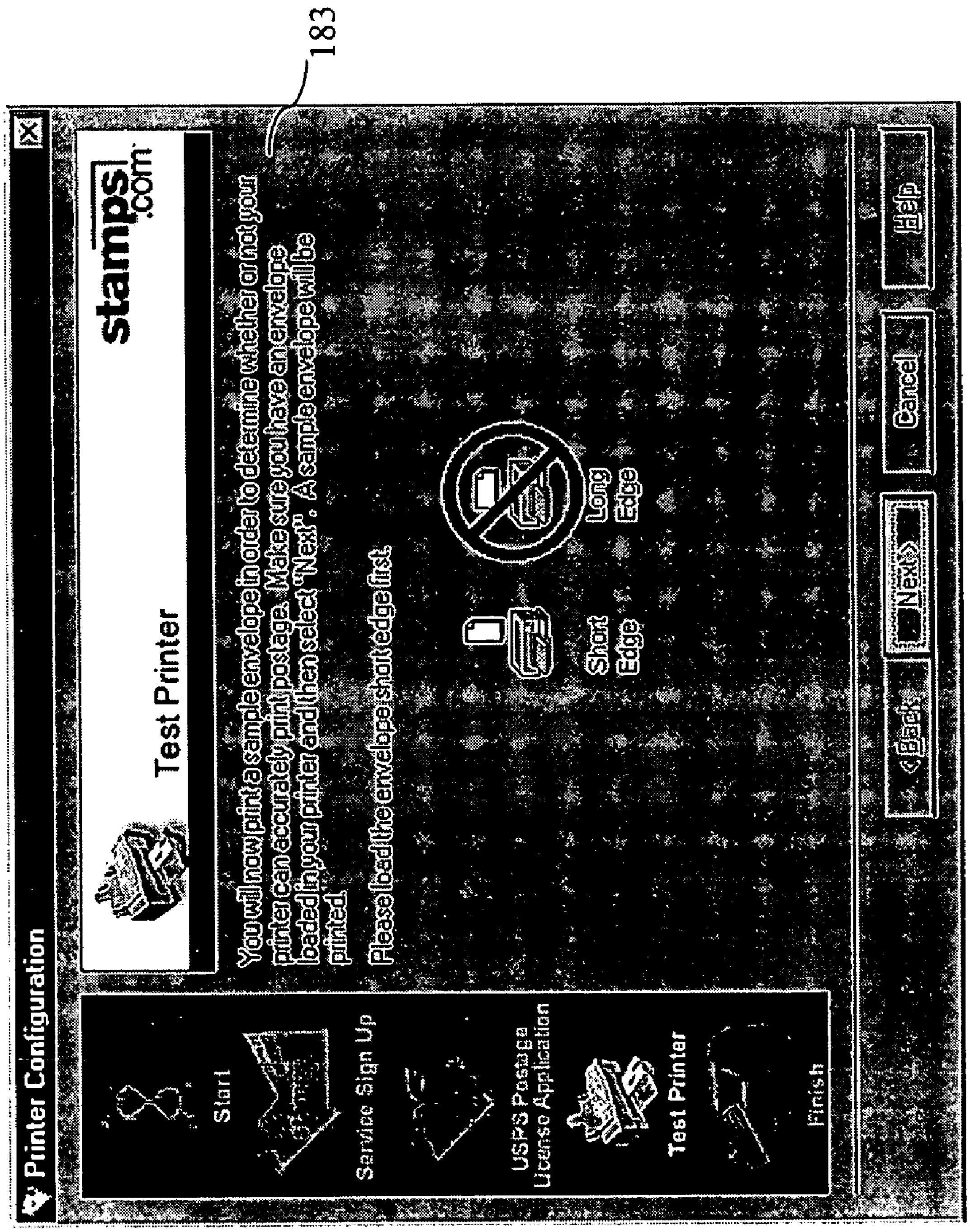
FIG. 34 is a capture of a test printer screen informing the user that a sample envelope will need to be printed to determine whether the user's printer can accurately print postage in accordance with an exemplary embodiment of the present invention.

A print configuration wizard may be initiated if print parameters for the default printer are not stored in the server based printer database, or if the sample QA envelope (see FIG. 25) does not match the displayed envelope. A logic flow diagram of an exemplary print configuration wizard is shown in FIG. 33. Referring to FIG. 34, a test printer screen preferably prompts the user to place an envelope in the printer feed tray. The test printer screen advises the user that a sample envelope needs to be printed to determine whether the user's printer can print postal indicia and instructs the user to insert the envelope short edge first 183. When the user selects “Next>”, a test pattern including, for example, a circle, a square, and a triangle may be printed 186 (FIG. 33) on the envelope inserted into the printer.

One of ordinary skill in the art will appreciate that the test pattern is not limited to the described combination of shapes. Rather the test pattern may comprise, for example, any combination of shapes, symbols, letters or numbers. Alternatively, a single character may also be used, wherein the printer offset may be determined in accordance with how the single character prints on a test envelope. Therefore, the described test pattern is by way of example and not by way of limitation.

Figure 35:
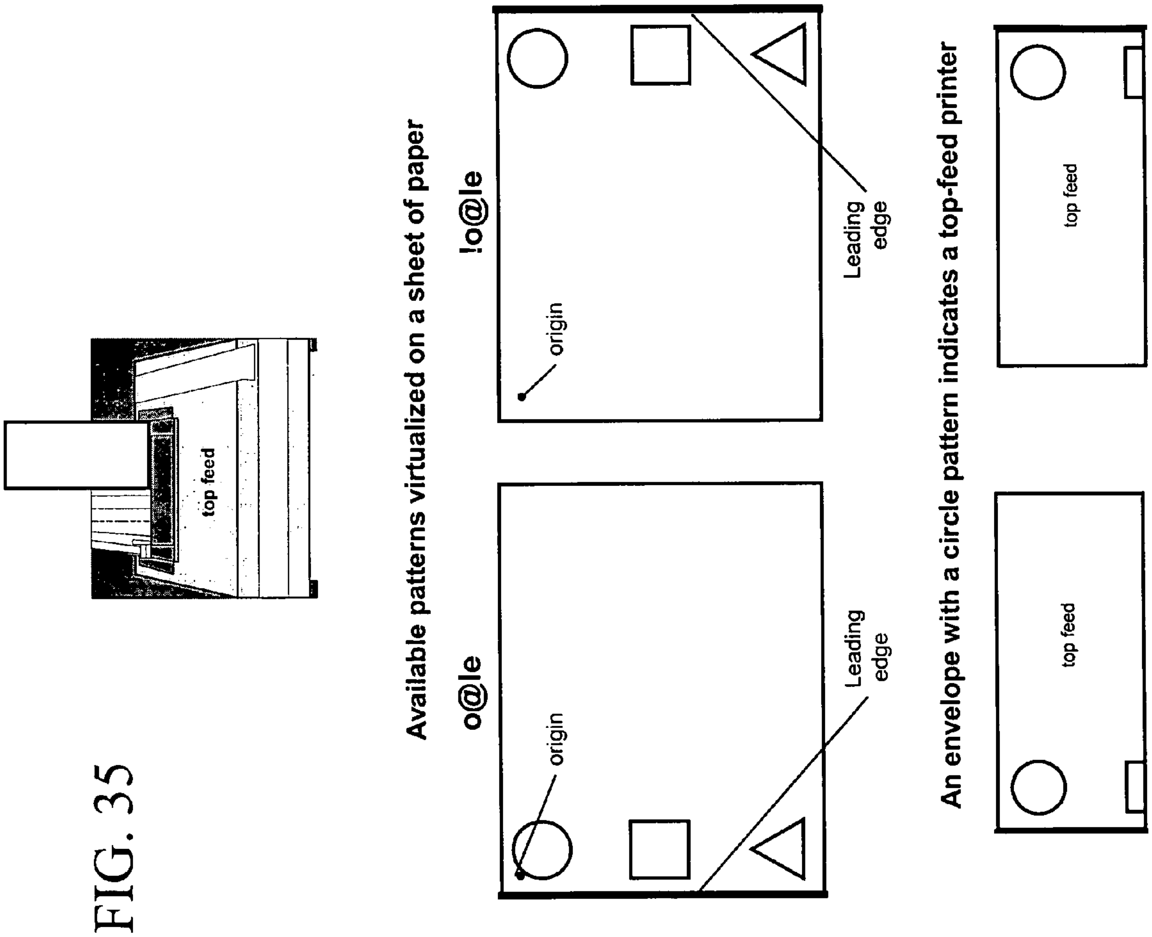
FIGS. 35–37 are diagrams illustrating a series of test patterns printed onto a test envelope to determine the printer offset in accordance with an exemplary embodiment of the present invention.
Figure 36:
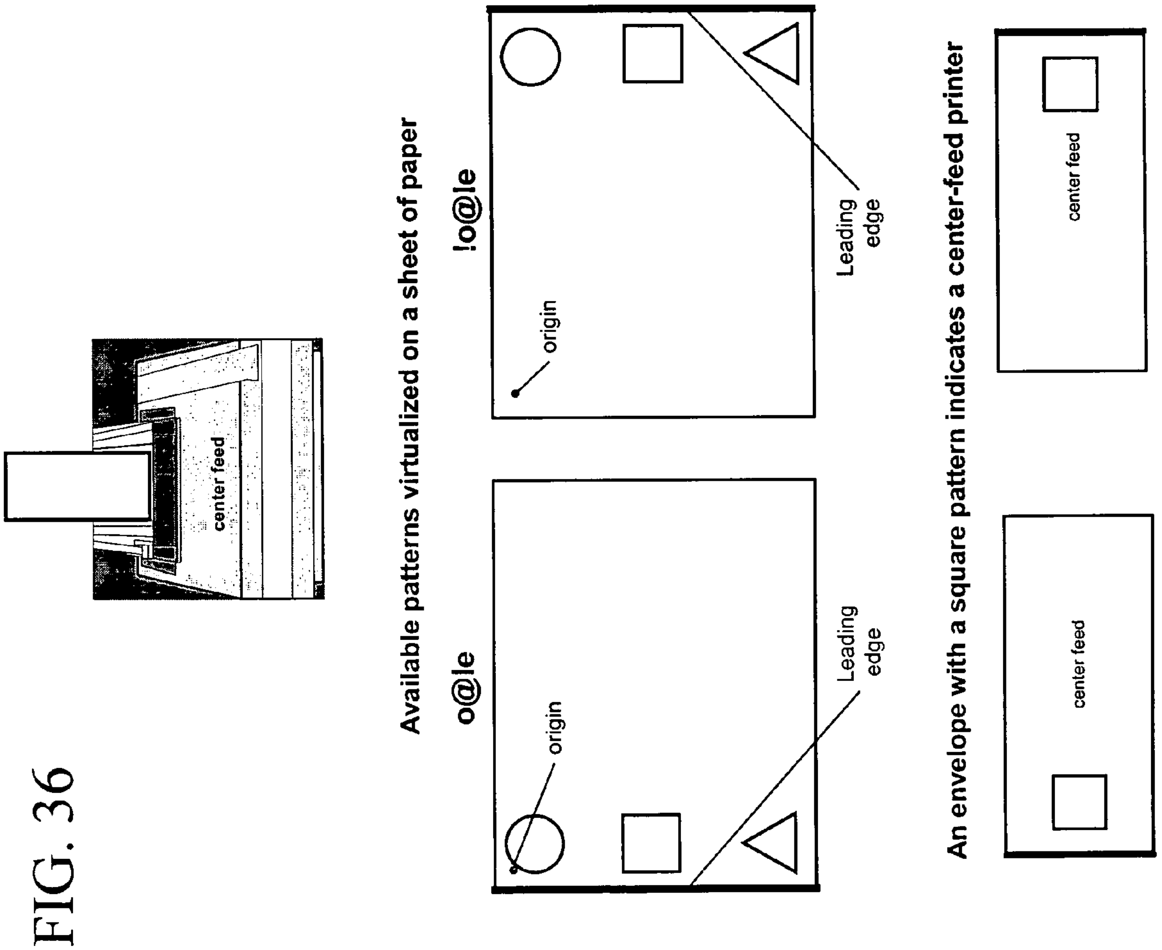
Figure 37:
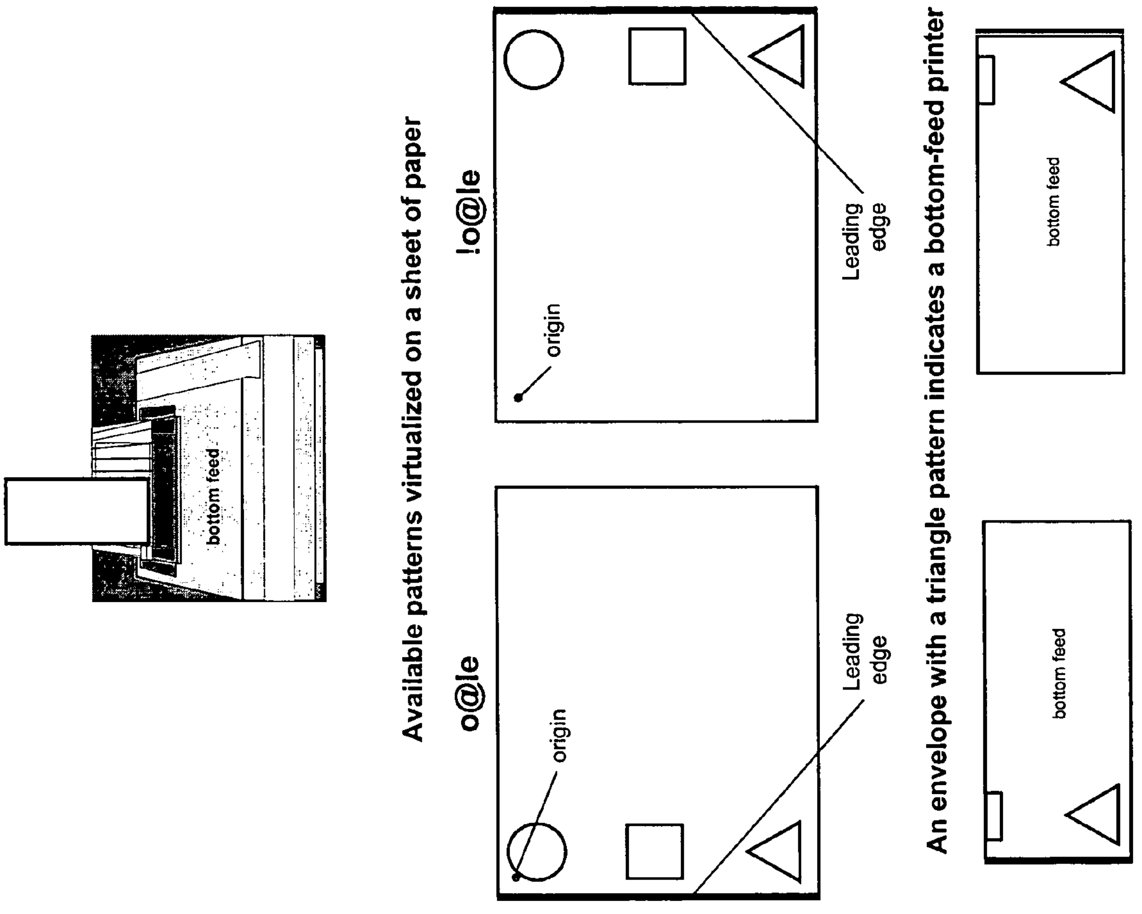

The client software preferably draws all three shapes on a virtualized sheet. In an exemplary embodiment, only one of the shapes completely prints onto the envelope in accordance with how an envelope is fed into the printer. For example, in an exemplary embodiment a top feed printer (see FIG. 35) results in a circle being printed onto a test envelope, wherein a square pattern indicates a center feed printer (see FIG. 36) and a triangle pattern indicates a bottom feed printer (see FIG. 37). The top, center or bottom designations are in reference to the location of the origin on the virtualized paper.

Figure 38:
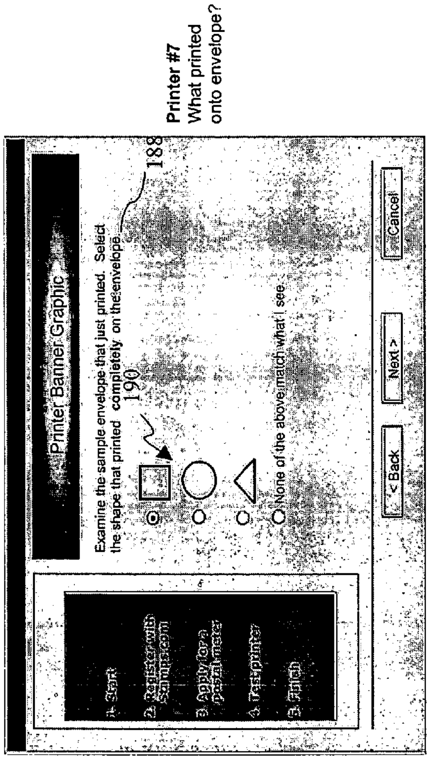
FIG. 38 is a capture of a screen asking which of a plurality of possible test patterns printed onto a test envelope in accordance with an exemplary embodiment of the present invention.

Referring to FIG. 38, the system preferably asks the user to select which shape printed on the envelope 188 by for example, selecting one of a series of buttons 190, each of which corresponds to one of the particular shapes in the test pattern. Based upon this result, the system may determine the appropriate offset. Referring back to FIG. 33, the offset information may be sent to the server 192, and the user preferably continues with the insert envelope screen 128, within the printer setup flow diagram shown in FIG. 25.

Figure 39:
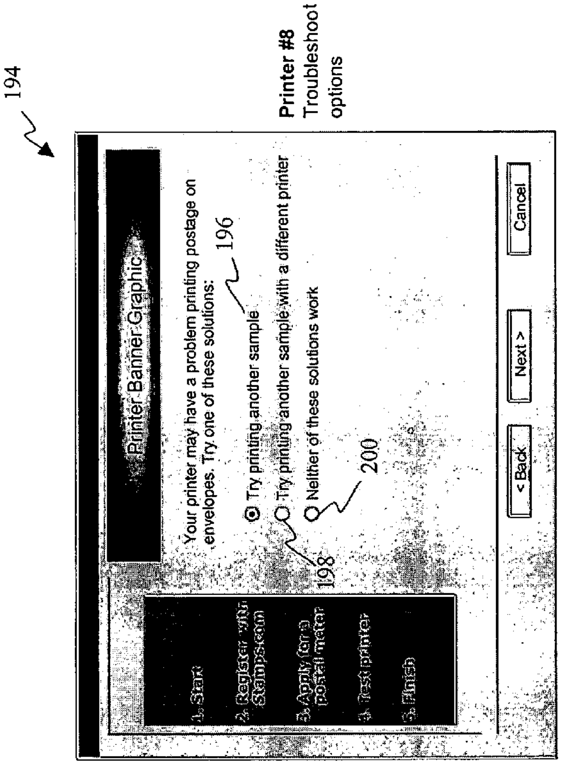
FIG. 39 is a capture of a trouble shoot screen asking which of a plurality of possible options a user would like to select to attempt to correct problems printing FIM barcode onto an envelope in accordance with an exemplary embodiment of the present invention.

If the user selects “none of the above match what I see” on FIG. 38, a trouble shoot screen 194 may appear as shown in FIG. 39. The trouble shoot screen 194 preferably presents the user with a series of options and preferably prompts the user to select an option, by for example, selecting one of a series of buttons, each of which corresponds to a particular option. Possible options may include for example:

Try printing another sample 196. If the user selects this option, a different test pattern is sent to the printer, so that the comparison process may be undertaken again.

Try printing another sample to a different printer 198. Selecting this option links the user back to the select default printer screen 121 of the print setup logic flow diagram (see FIG. 25), thus allowing the user to select another printer and start the process again.

Neither of these solutions work 200. Selecting this option indicates that the system cannot determine a feed offset and therefore cannot print envelopes using the user's printer.

Figure 40:
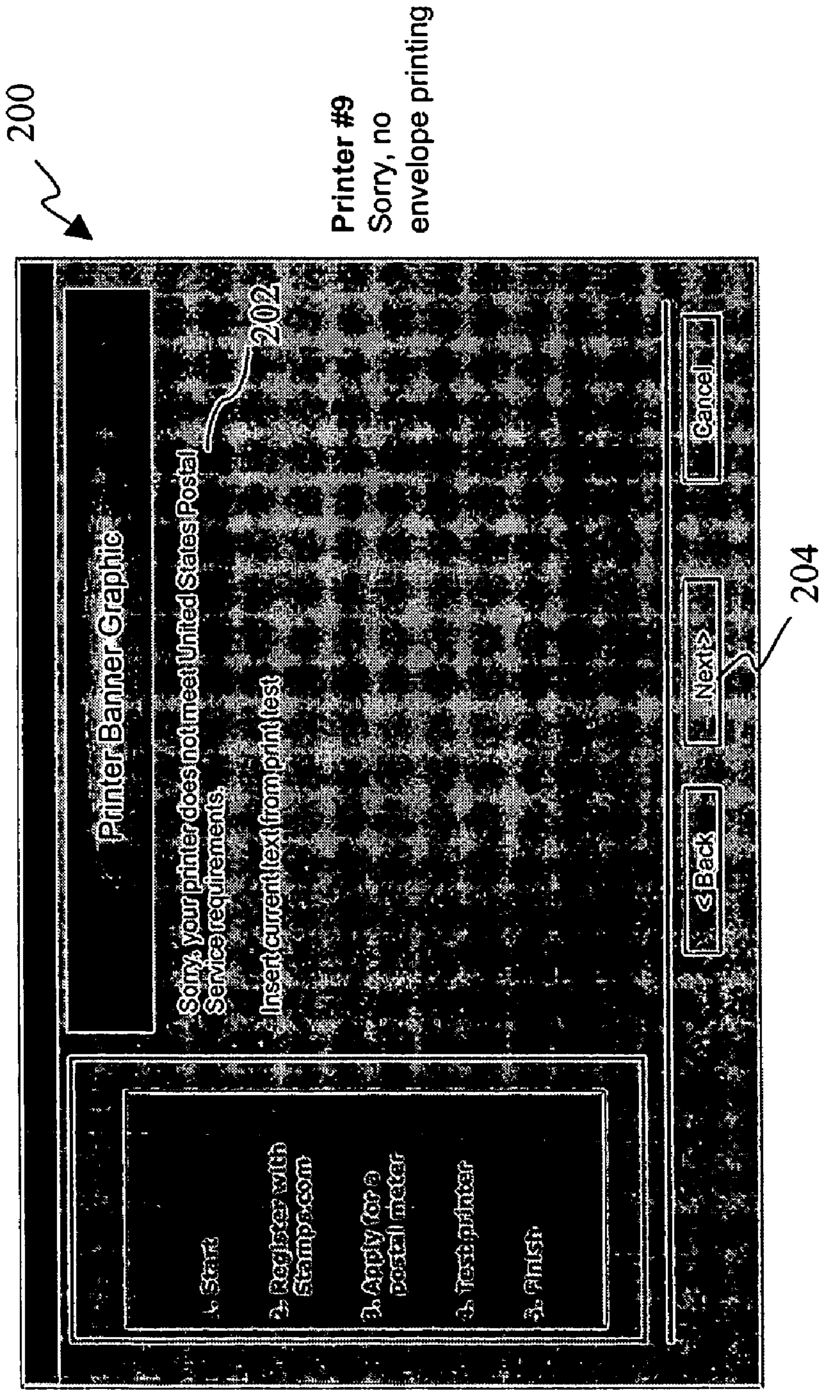
FIG. 40 is a capture of a screen informing the user that the current printer is unable to print FIM barcodes onto envelopes in accordance with USPS requirements in accordance with an exemplary embodiment of the present invention.
Figure 9:
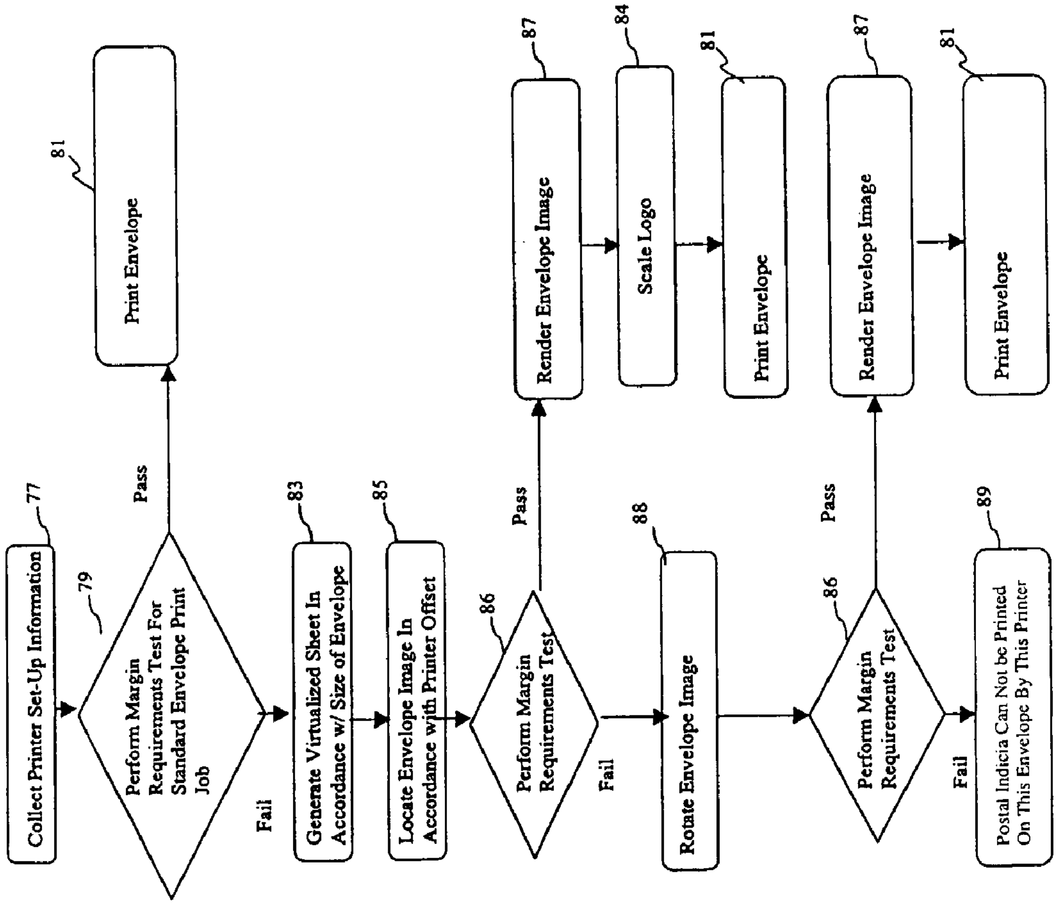

If the user selects “neither of these solutions work” from the plurality of options on FIG. 39, the system preferably informs the user that the current default printer does not support USPS requirements 202 and that the current printer is not able to print postage onto envelopes, only onto labels (see FIG. 40). A “Next>” button 204 may be immediately available. When the Next button 204 is selected, the client software preferably disables printing to envelopes 206 (see FIG. 33).

Although a preferred embodiment of the present invention has been described, it should not be construed to limit the scope of the appended claims. For example, the present invention may be implemented by a variety of computer based postage metering systems in accordance with a variety of print requirements promulgated by postal systems around the world. Further, although the operation of the present invention has been demonstrated in accordance with USPS requirements for PC based postal printing, the present invention is not limited to applications in accordance with the USPS requirements. Rather, the present invention is equally applicable for operation in all PC postal printing systems.

In addition, those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A method of printing information onto print media comprising:

translating a first component of said information as a function of printer margin size;

determining a printable bounding area as a function of said first component;

scaling a second component of said information as a function of said printable bounding area; and printing said information, wherein said information comprises postage information including a FIM.

2. The method of claim 1 wherein the step of shifting said first component of said information as a function of said printer margin size comprises shifting a human readable portion.

3. The method of claim 1 wherein the step of printing said information comprises printing a postal indicia comprising a FIM and said first and second components, wherein said first component is a human readable portion and said second component is a logo.

4. The method of claim 3 wherein the step of scaling said second component of said information comprises scaling width of said second component so that a sum of said printer margin, width of said human readable portion, width of said logo and width of said FIM clear zone is greater than about 1.875" and less than about 2.125".

5. A method of printing graphics onto print media comprising:

determining a printer offset as a function of how the print media is fed into the printer; and rendering an image of said graphic within a printable region as a function of said offset;

wherein the step of determining said printer offset comprises sending a print job having one or more patterns to said printer and determining said printer offset as a function of how said patterns print on a test envelope.

6. The method of claim 5 wherein the step of determining said printer offset comprises:

selecting a printer;

determining the offset for the printer from a printer database having information on one or more printer drivers.

7. A method of printing information onto a print media comprising:

querying one or more databases, containing set up data on one or more printer drivers, to determine set up data for a user's printer;

performing a printer configuration test to determine the set up data for the user's printer as a function of said query;

storing results of said printer configuration test in said one or more databases for use by subsequent users; and printing said information onto said print media in accordance with said set up data.

8. The method of claim 7 wherein the step of determining set up data from said database comprises determining a printer offset as a function of how the print media is fed into a printer.

9. The method of claim 8 wherein the step of performing a printer configuration test comprises sending a print job having one or more patterns to said printer and determining said printer offset as a function of how said one or more patterns print on a test print media.

10. The method of claim 7 wherein the step of determining set up information from said one or more databases comprises determining a shift code for a paper feed tray to determine how guides of the paper feed trays move to feed the print media into the printer.

11. The method of claim 7 further comprising rotating an image of said information into landscape mode and compensating for over rotation of said image in accordance with a variable stored in said one or more databases.

12. The method of claim 7 wherein the step of determining set up data from said one or more databases comprises determining whether said printer configuration test may be used to support printers whose set up data is not known, and if unknown printers are not allowed, notifying a user who selects a printer whose set up data is not known that the selected printer is not supported.

13. The method of claim 7 wherein the step of determining set up data from said one or more databases comprises determining print media supported by a user's printer.

14. The method of claim 7 wherein the step of determining set up data from said one or more databases comprises determining size of print media.

15. The method of claim 7 further comprising querying one or more printer databases, containing set up information on one or more printers, to determine set up data for a user's printer.

16. A system for printing information onto a print media comprising:

means for querying one or more databases, containing set up data on one or more printer drivers, to determine set up data for a user's printer;

means for performing a printer configuration test to determine said set up data as a function of said query;

means for storing results of said printer configuration test in said one or more databases for use by subsequent users; and means for printing said information onto said print media in accordance with said set up data.

17. The system of claim 16 wherein the means for querying one or more databases to determine the set up data for the user's printer comprises means for querying one or more databases to determine a printer offset as a function of how the print media is fed into a printer.

18. The method of claim 17 wherein the performing said printer configuration test comprises means for sending a print job having one or more patterns to said printer and determining said printer offset as a function of how said one or more patterns print on a test print media.

19. The method of claim 16 further comprising means for rotating an image of said information into landscape mode and means for compensating for over rotation of said image in accordance with a variable stored in said one or more databases.

20. The method of claim 16 wherein the means for querying one or more databases to determine set up data comprises means for querying one or more databases to determine print media supported by a user's printer.

21. The method of claim 16 wherein the means for querying one or more databases to determine set up data comprises means for querying one or more databases to determine size of print media.

22. The method of claim 16 means for querying one or more databases, containing set up information on one or more printers, to determine set up data for said user's printer.

* * * * *

UNITED STATES PATENT AND TRADEMARK OFFICE

CERTIFICATE OF CORRECTION

PATENT NO. : 6,965,451 B2
APPLICATION NO. : 09/651389
DATED : November 15, 2005
INVENTOR(S) : Ogg et al.

It is certified that error appears in the above-identified patent and that said Letters Patent is hereby corrected as shown below:

On the Title Page

| | |
|---|---|
| (56) References Cited<br>Other Publications<br>1st Reference | After "Icon",<br>Insert --Works-- |
| (57) Abstract, line 11 | Delete "database",<br>Insert --databases-- |

In the Claims

| | |
|---|---|
| Column 23, line 28, Claim 6 | After "printer;",<br>Insert --and-- |

In the Drawings

| | |
|---|---|
| FIG. 9, Sheet 8 of 38, Ref No. 89 | Delete Drawing Sheet 8 and substitute therefore the Drawing Sheet, consisting of Fig. 9, as shown on the attached page |

Signed and Sealed this

Tenth Day of October, 2006

JON W. DUDAS

*Director of the United States Patent and Trademark Office*

UNITED STATES PATENT AND TRADEMARK OFFICE

CERTIFICATE OF CORRECTION

PATENT NO. : 6,965,451 B1
APPLICATION NO. : 09/651389
DATED : November 15, 2005
INVENTOR(S) : Craig Leonard Ogg It is certified that error appears in the above-identified patent and that said Letters Patent is hereby corrected as shown below:

| | |
|---|---|
| Column 24, line 37, Claim 18 | Delete “method”, |
| | Insert --system-- |
| Column 24, line 42, Claim 19 | Delete “method”, |
| | Insert --system-- |
| Column 24, line 47, Claim 20 | Delete “method”, |
| | Insert --system-- |
| Column 24, line 51, Claim 21 | Delete “method”, |
| | Insert --system-- |
| Column 24, line 55, Claim 22 | Delete “method”, |
| | Insert --system-- |

Signed and Sealed this

Twenty-sixth Day of August, 2008

Jon W. Dudas

JON W. DUDAS
*Director of the United States Patent and Trademark Office*